US012726865B2

(12) United States Patent
Mattam et al.

(10) Patent No.: US 12,726,865 B2
(45) Date of Patent: Sep. 1, 2026

(54) HANDLING LAYER 3 AND LTM MEASUREMENT IN WIRELESS NETWORK

(71) Applicant: Samsung Electronics Co., Ltd., Suwon-si (KR)

(72) Inventors: Jajohn Mathew Mattam, Bangalore (IN); Sanjukta Biswas, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 18/753,614

(22) Filed: Jun. 25, 2024

(65) Prior Publication Data

US 2025/0031114 A1 Jan. 23, 2025

Related U.S. Application Data

(63) Continuation of application No. PCT/KR2024/006918, filed on May 22, 2024.

(30) Foreign Application Priority Data

Jul. 21, 2023 (IN) ............................ 202341049394
Mar. 20, 2024 (IN) ............................ 2023 41049394

(51) Int. Cl.
*H04W 36/00* (2009.01)
*H04W 36/04* (2009.01)

(52) U.S. Cl.
CPC ....... *H04W 36/0085* (2018.08); *H04W 36/04* (2013.01)

(58) Field of Classification Search
CPC ......... H04W 36/0058; H04W 36/0085; H04W 36/0094; H04W 36/04

(Continued)

(56) References Cited

U.S. PATENT DOCUMENTS

2023/0170965 A1 6/2023 Cui et al.
2024/0163744 A1* 5/2024 Agiwal ............ H04W 36/0055

(Continued)

FOREIGN PATENT DOCUMENTS

CN 115189825 A 10/2022
CN 119012226 A 11/2024

(Continued)

OTHER PUBLICATIONS

Huawei et al.; Solutions for L1/L2 mobility; 3GPP TSG-RAN2 Meeting #119-e; R2-2207738; Electronic meeting; Aug. 17-29, 2022.

(Continued)

*Primary Examiner* — Robert J Lopata
(74) *Attorney, Agent, or Firm* — Jefferson IP Law, LLP

(57) ABSTRACT

Handling layer 3 handover and layer 1/layer 2 Triggered Mobility (LTM) measurement in a wireless network is provided. The method performed by a user equipment (UE) includes receiving layer 3 measurement reporting configuration and LTM measurement reporting configuration from a centralized unit (CU) in the wireless network; determining layer 3 measurement for cell at the layer 1 of the UE based on the layer 3 measurement reporting configuration, and LTM measurement for cell at the layer 1 of the UE based on the LTM measurement reporting configuration; determining whether the layer 3 measurement meets layer 3 measurement reporting criteria, and whether the LTM measurement meets LTM measurement reporting criteria; and transmitting one of the layer 3 measurement to the CU, or the LTM measurement to a distributed unit (DU).

20 Claims, 12 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2024/0179590 | A1 | 5/2024 | Cao et al. | |
| 2024/0214879 | A1 | 6/2024 | Chandrashekar et al. | |
| 2024/0284284 | A1 * | 8/2024 | Jin | H04W 36/00837 |
| 2024/0292307 | A1 * | 8/2024 | Ashraf | H04W 36/324 |
| 2024/0340720 | A1 * | 10/2024 | Hong | H04W 56/0045 |
| 2024/0340734 | A1 * | 10/2024 | Park | H04W 36/04 |
| 2026/0025875 | A1 * | 1/2026 | Abdul Latheef | H04W 56/0045 |
| 2026/0101251 | A1 * | 4/2026 | Wu | H04W 36/0055 |
| 2026/0156548 | A1 * | 6/2026 | Martin | H04W 36/0088 |

FOREIGN PATENT DOCUMENTS

| | | | |
|---|---|---|---|
| WO | 2022/233545 | A1 | 11/2022 |
| WO | 2023/285099 | A1 | 1/2023 |
| WO | 2023/066556 | A1 | 4/2023 |
| WO | 2024/167273 | A1 | 8/2024 |
| WO | 2024/168654 | A1 | 8/2024 |
| WO | 2024/211559 | A1 | 10/2024 |

OTHER PUBLICATIONS

Nokia et al.; Enhancements on Multi-beam Operation; 3GPP TSG RAN WG1 #105-e; R1-2105273; e-Meeting; May 10-27, 2021.

Qualcomm Incorporated; [AT121bis-e][019][eMob] L1 Measurements (Qualcomm); 3GPP TSG-RAN WG2 Meeting #121bis-e; R2-2304548; Electronic; Mar. 17-25, 2023.

Nokia et al.; Layer-1 Enhancements for L1/L2-triggered Mobility; 3GPP TSG RAN WG1 #112; R1-2300384; Athens, Greece; Feb. 27-Mar. 3, 2023.

International Search Report with Written Opinion dated Sep. 13, 2024; International Appln. No. PCT/KR2024/006918.

Interdigital, Inc.; LTM Measurement considerations; 3GPP TSG RAN WG2 #121; R2-2300576; Athens, Greece; Feb. 27-Mar. 3, 2023.

Huawei; (TP for L1 L2Mob BLCR for TS 38.401 and TS 38.473): Continuation on LTM procedure design; 3GPP TSG-RAN WG3 Meeting #120; R3-232825; Incheon, KR; May 22-May 26, 2023.

Extended European Search Report dated Mar. 19, 2026; European Appln. No. 24845750.9-1206/4652771 PCT/KR2024006918.

* cited by examiner

HANDLING LAYER 3 AND LTM MEASUREMENT IN WIRELESS NETWORK

CROSS-REFERENCE TO RELATED APPLICATION(S)

This application is a continuation application, claiming priority under § 365 (c), of an International application No. PCT/KR2024/006918, filed on May 22, 2024, which is based on and claims the benefit of an Indian Provisional patent application No. 20/234,1049394, filed on Jul. 21, 2023, in the Indian Intellectual Property Office, and of an Indian Complete patent application Ser. No. 20/234, 1049394, filed on Mar. 20, 2024, in the Indian Intellectual Property Office, the disclosure of each of which is incorporated by reference herein in its entirety.

FIELD OF INVENTION

The disclosure relates to wireless networks. More particularly, the disclosure relates to handling layer 3 (L3) handover and layer 1/layer 2 (L1/L2) Triggered Mobility (LTM) measurement in a wireless network.

BACKGROUND

Handover in mobility refers to the seamless transfer of an ongoing communication session of a user equipment (UE) from one cell, such as a base station or gNodeB (gNB), to another cell while in a connected state. The primary objective of this process is to ensure uninterrupted connectivity and sustained service for the user, especially when they are in motion.

There are two types of handovers: beam level mobility and cell level mobility. An L1/L2 Triggered Mobility (LTM) is a procedure in which the gNB receives L1 measurement reports from the UE, and initiates a switch of the serving cells through a cell switch command delivered by a Medium Access Control (MAC) Control Element (CE). The LTM candidate cell configuration is provided to the UE through Radio Resource Control (RRC) signalling message, and can only be added, modified, or released by network apparatus via RRC signalling.

The LTM procedure reduces the mobility latency of the handover, and supports both intra-gNB-Distributed Unit (DU) and intra-gNB-Centralized Unit (CU) mobility, as well as inter-gNB-DU mobility. It also supports inter-frequency mobility, including mobility to an inter-frequency cell that is not the current serving cell. This versatile L1/L2 based inter-cell mobility procedure finds application in various scenarios, including Standalone Carrier Aggregation (CA), New Radio-Dual Connectivity (NR-DC), Intra-DU, and Intra-CU Inter-DU cases.

Moreover, this mobility procedure extends its utility to both intra-frequency and inter-frequency scenarios covering Frequency Range 1 (FR1) and Frequency Range 2 (FR2). Notably, it accommodates situations where source and target cells may exhibit synchronization or operate independently, providing a comprehensive approach to seamless inter-cell mobility across diverse $5^{th}$ Generation (5G) network environments.

In current methodologies, L3 and L1 measurements function autonomously without any synchronization between them. This lack of coordination between the two procedures results in independent triggering and reporting of measurements. Moreover, at the network (NW) end, the L3 handover decision is made by the CU while the LTM decision is taken by the DU, again without any interdependence. The complete independence of procedures between UE and NW equipment poses a risk of failure or performance issues arising from undesirable CU or DU switches.

The above information is presented as background information only to assist with an understanding of the disclosure. No determination has been made, and no assertion is made, as to whether any of the above might be applicable as prior art with regard to the disclosure.

OBJECT OF PRESENT DISCLOSURE

Aspects of the disclosure are to address at least the above-mentioned problems and/or disadvantages and to provide at least the advantages described below. Accordingly, an aspect of the disclosure is to provide L3 measurement configuration for legacy handover and L1 measurement configuration for LTM that will be evaluated together.

Another aspect of the disclosure is to provide the measurement report that is sent for the best cell and chooses the best option between legacy handover and LTM in all handover cases.

Another aspect of the disclosure is to establish a network that transmits L3 measurement reporting and L1 measurement reporting configuration via RRC message. The L3 measurement configuration is held in L3, while the L1 measurement configuration (for LTM) will be relayed to L1.

Another aspect of the disclosure is to evaluate cells that are configured for both legacy handover and LTM concurrently. The following scenarios may arise only L3 measurements meet the reporting criteria, only LTM measurements meet the reporting criteria, both L3 and LTM measurements meet the reporting criteria, or no cells meet the reporting criteria. Based on various conditions, L1 determines whether to transmit an L1 measurement report to DU or indicate the L3 measurements to RRC for cell switching control.

Additional aspects will be set forth in part in the description which follows and, in part, will be apparent from the description, or may be learned by practice of the presented embodiments.

SUMMARY

In accordance with an aspect of the disclosure, a method performed by a user equipment (UE) for handling layer 3 handover and layer 1/layer 2 triggered mobility (LTM) measurement in a wireless network is provided. The method includes receiving, by the UE, a layer 3 measurement reporting configuration and a LTM measurement reporting configuration from a centralized unit (CU) of a network apparatus in the wireless network, determining, by the UE, measurements for cells configured for the layer 3 handover at the layer 1 of the UE based on the layer 3 measurement reporting configuration, and measurements for cells configured for the LTM measurement at the layer 1 of the UE based on the LTM measurement reporting configuration and determining at least one of layer 3 measurement for the cells configured for the layer 3 handover meets the layer 3 measurement reporting criteria, or that the LTM measurement for the cells configured for the LTM measurement meets LTM measurement reporting criteria to transmit one of the layer 3 measurement to the network apparatus (CU) when the layer 3 measurement for the cells configured for the layer 3 handover meets the layer 3 measurement reporting criteria and the LTM measurement to the network apparatus (DU) when the LTM measurement for the cells configured for the LTM measurement meets the LTM measurement reporting criteria.

In an embodiment, in case that the layer 3 measurement reporting criteria is met, the method includes determining, by the UE, whether time to trigger (TTT) for the layer 3 measurement reporting criteria is met, in case that the TTT for the layer 3 measurement reporting criteria is met, checking whether LTM measurement reporting criteria is met, and whether the LTM measurement is better than the layer 3 measured cell to forward the LTM measurements for LTM reporting, and in case that the LTM measurement reporting criteria is not met, or the LTM measurement is not better than the layer 3 measured cell to forward the LTM measurements for LTM reporting, forwarding, by the UE, the LTM measurements to a radio resource control (RRC) for LTM reporting, and in case that the TTT for the layer 3 measurement reporting criteria is not met, forwarding, by the UE, the LTM measurements to RRC for LTM measurement reporting.

In an embodiment, the determining, by the UE, that the layer 3 measurement reporting criteria is met includes waiting for the TTT for the LTM measurements before forwarding the LTM measurements for LTM reporting.

In an embodiment, in case that the LTM measurement reporting criteria is met the method further includes determining, by the UE, whether a time to trigger (TTT) for the LTM measurement reporting criteria is met, in case that the TTT for the LTM measurement reporting criteria is met checking whether the layer 3 measurement reporting criteria is met, and whether the layer 3 measurement is better than LTM measured cell to forward the layer 3 measurements for layer 3 reporting, and in case that the layer 3 measurement reporting criteria is not met, or the layer 3 measurement is not better than LTM measured cell to forward the layer 3 measurements for layer 3 reporting, forwarding, by the UE, the layer 3 measurements to layer 1 for the LTM reporting, and in case that the TTT for the LTM measurement reporting criteria is not met, forwarding, by the UE, the layer 3 measurements to layer 1 for the LTM reporting.

In an embodiment, the determining, by the UE, that the LTM measurement reporting criteria is met includes waiting for the TTT for the layer 3 measurements before forwarding the layer 3 measurements for layer 3 reporting.

In an embodiment, the determining, by the UE, at least one of the layer 3 measurements for the cells configured for the layer 3 handover meets the layer 3 measurement reporting criteria, or that the LTM measurement for the cells configured for the LTM measurement meets the LTM reporting criteria includes determining, by the UE, that both the layer 3 measurement reporting criteria and the LTM measurement reporting criteria are met, determining, by the UE, whether a time to trigger (TTT) for the layer 3 measurement reporting criteria is met, in case that the TTT for the layer 3 measurement reporting criteria is met checking whether the LTM measurement reporting criteria is met, and whether the LTM measurement reporting criteria is better than the layer 3 measured cell, and in case that the LTM measurement reporting criteria is met and the LTM measurement reporting criteria is better than the layer 3 measured cell, waiting for a TTT for the LTM measurements before forwarding the LTM measurements for LTM reporting, and in case that the LTM measurement reporting criteria is not met or the LTM measurement reporting criteria is not better than the layer 3 measured cell, forwarding, by the UE, the LTM measurements to a radio resource control (RRC) for LTM measurement reporting, and in case that the TTT for the layer 3 measurement reporting criteria is not met, forwarding, by the UE, the LTM measurements to the RRC for the layer 1 reporting.

In an embodiment, the determining, by the UE, that both the LTM measurement reporting criteria are met and the layer 3 measurement reporting criteria is met includes waiting for the TTT for the LTM measurements before forwarding the LTM measurements for LTM reporting.

In an embodiment, the method further includes determining, by the UE, that both the LTM measurement reporting criteria and the LTM measurement reporting criteria are met to perform one of determining, by the UE, whether the TTT for the LTM measurement reporting criteria is met, checking whether the layer 3 measurement reporting criteria is met, and whether the layer 3 measurement reporting criteria is better than the LTM measured cell then waiting for the layer 3 measurements, and forwarding, by the UE the layer 3 measurements for layer 3 measurement reporting, when the criteria is met, or forwarding, by the UE, the layer 3 measurements to layer 1 for the LTM reporting, when no criteria is met.

In an embodiment, the determining, by the UE, that both the LTM measurement reporting criteria and the layer 3 measurement reporting criteria are met includes waiting for the TTT for the layer 3 measurements before forwarding the layer 3 measurements for layer 3 reporting.

In an embodiment, the determining, by the UE, that both the LTM measurement reporting criteria and the layer 3 measurement reporting criteria are met includes waiting for the TTT for the layer 3 measurements before forwarding the layer 3 measurements for layer 3 reporting.

In accordance with another aspect of the disclosure, a user equipment (UE) for handling layer 3 handover and layer1/layer2 triggered mobility (LTM) measurement in the wireless network is provided. The UE includes memory storing one or more computer programs, and one or more processors communicatively coupled to the communicator and the memory, wherein the one or more computer programs include computer-executable instructions that, when executed by the one or more processors, cause the UE to receive a layer 3 measurement reporting configuration and a LTM measurement reporting configuration from a centralized unit (CU) of a network apparatus in the wireless network, determine measurements for cells configured for the layer 3 handover at the layer 1 of the UE based on the layer 3 measurement reporting configuration, determine measurements for cells configured for the LTM measurement at the layer 1 of the UE based on the LTM measurement reporting configuration, determine at least one of layer 3 measurement for the cells configured for the layer 3 handover meets layer 3 measurement reporting criteria, or that the LTM measurement for the cells configured for the LTM measurement meets LTM measurement reporting criteria, and transmit, by the UE, one of the layer 3 measurement to the CU of the network apparatus when the layer 3 measurement for the cells configured for the layer 3 handover meets the layer 3 measurement reporting criteria, or the LTM measurement to a distributed unit (DU) of the network apparatus when the LTM measurement for the cells configured for the LTM measurement meets the LTM measurement reporting criteria.

In accordance with another aspect of the disclosure, one or more non-transitory computer-readable storage media storing one or more computer programs including computer-executable instructions that, when executed by one or more processors of a user equipment (UE), cause the UE to perform operations are provided. The operations include receiving, by the UE, layer 3 measurement reporting configuration and LTM measurement reporting configuration from a centralized unit (CU) of a network apparatus in the wireless network, determining, by the UE, measurements for cells configured for the layer 3 handover at the layer 1 of the UE based on the layer 3 measurement reporting configuration, and measurements for cells configured for the LTM measurement at the layer 1 of the UE based on the LTM measurement reporting configuration, determining, by the UE, at least one of layer 3 measurement for the cells configured for the layer 3 handover meets layer 3 measurement reporting criteria, or that the LTM measurement for the cells configured for the LTM measurement meets LTM measurement reporting criteria, and transmitting, by the UE, one of the layer 3 measurement to the CU of the network apparatus when the layer 3 measurement for the cells configured for the layer 3 handover meets the layer 3 measurement reporting criteria, or the LTM measurement to a distributed unit (DU) of the network apparatus when the LTM measurement for the cells configured for the LTM measurement meets the LTM measurement reporting criteria.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF INVENTION

Figure 1A:
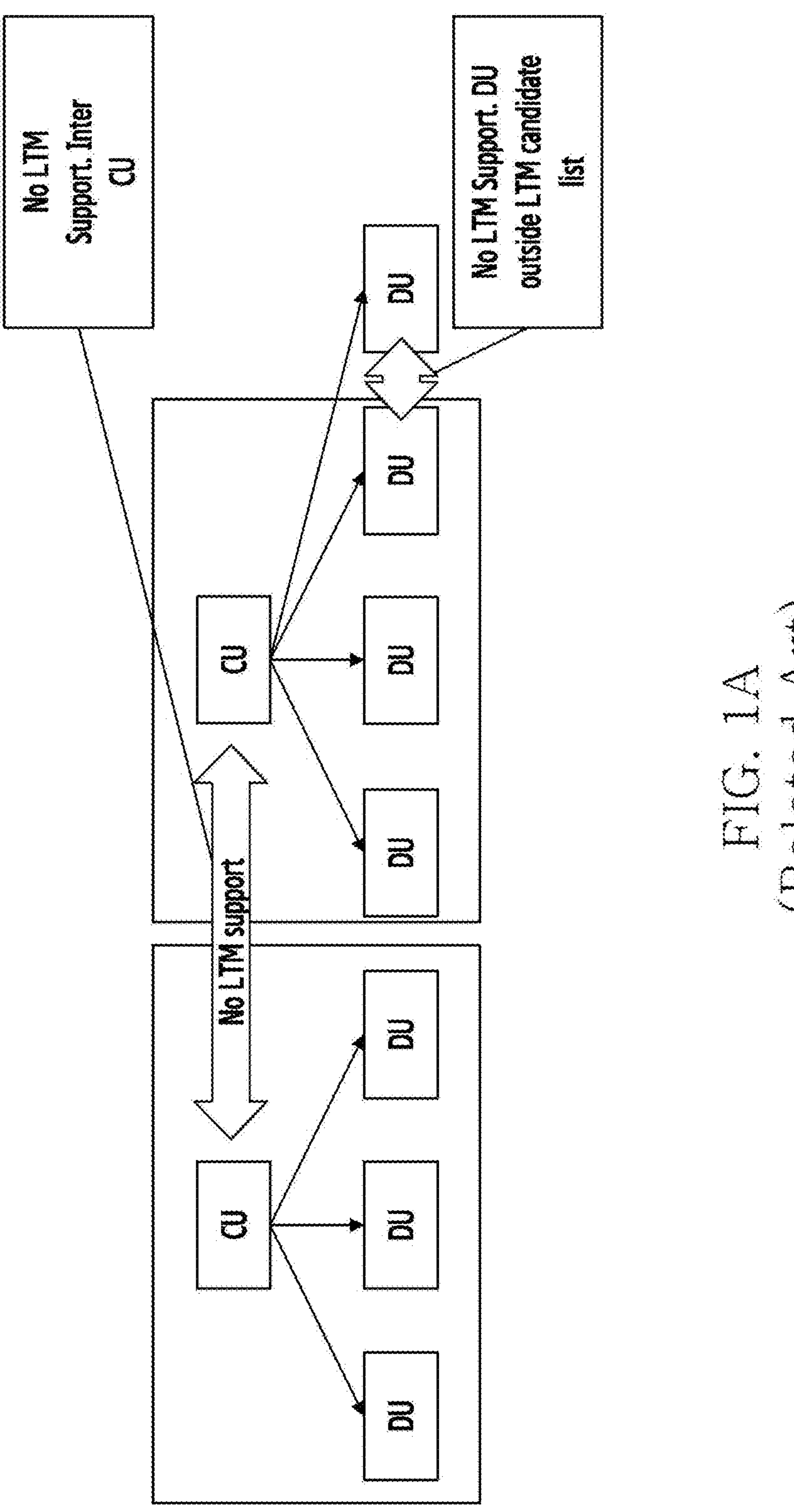
FIG. 1A is a block diagram for a legacy handover including L3 measurements, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

In current methodologies, the LTM cell alterations arise with greater frequency owing to reduced latency and shorter measurement evaluation periods (known as TTT, or Time To Trigger). This, in turn, causes certain instances where the L3 (such as inter-CU) handover is triggered either too early or too late. Furthermore, if an LTM cell change occurs during the time-to-trigger for a Layer 3 (L3) measurement event, the event may not be triggered at all. Consequently, the L3 event evaluation must be restarted based on the L3 measurements configured for the new serving cell, ultimately leading to delayed inter-CU handover and, ultimately, Radio Link Failure (RLF).

In certain techniques, the LTM cell alterations are more frequent owing to reduced latency and shorter measurement evaluation periods (e.g., TTT (Time To Trigger)). As a result, the L3 (e.g., inter-CU) handover may be initiated prematurely or belatedly in some cases. The L3 reporting criteria can be satisfied based on the configured events and criteria. However, if the established criteria are not optimal, it is possible for the L3 reporting criteria to be met even if there are satisfactory beams or Dus within the configured LTM. In such instances, migrating to another CU or outside the LTM configuration may not be the most desirable option.

In conventional method, L3 measurements and Layer 1 (L1) measurements are not synchronized and operate independently. Consequently, measurement triggers and reporting are also independent of each other. At the network level, L3 handover decisions are made by the CU, while LTM decisions are made by the DU, each acting independently of the other. This independent procedure at both the UE and NW sides may lead to failures or performance issues due to undesirable CU or DU switches. However, in the disclosure, both L3 and L1 measurements and reporting at the UE side are synchronized, and the decision of reporting is intelligently made to ensure optimal performance.

Accordingly, a method and UE for handling layer 3 handover and layer 1/layer 2 (L1/L2) Triggered Mobility (LTM) measurement in a wireless network. The method includes receiving a layer 3 measurement reporting configuration and a LTM measurement reporting configuration from a network apparatus (CU) in the wireless network and determining measurements for cells configured for the layer 3 handover at the layer 1 of the UE based on the layer 3 measurement reporting configuration. Further, the method includes determining measurements for cells configured for the LTM measurement at the layer 1 of the UE based on the LTM measurement reporting configuration and determining at least one layer 3 measurement for the cells configured for the layer 3 handover meets the layer 3 measurement reporting criteria, and the LTM measurement for the cells configured for the LTM measurement meets the LTM reporting criteria to transmit one of the layer 3 measurement to the network apparatus (CU) when the layer 3 measurement for the cells configured for the layer 3 handover meets the layer 3 measurement reporting criteria and the LTM measurement to the network apparatus (DU) when the LTM measurement for the cells configured for the LTM measurement meets the LTM measurement reporting criteria.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

FIG. 1A is a block diagram for a legacy handover including L3 measurements, according to the related art.

Referring to FIG. 1A, the block diagram includes a Centralized Unit (CU) (104), Distributed Unit (DU) (102) in the wireless network. The DU (102) constitutes a crucial component of the Radio Access Network (RAN) architecture, forming an integral part of the functional split between the CU (104) and the DU (102) in the network's radio interface processing. Positioned in close proximity to the radio units or antennas, the DU (102) provides vital support for a range of radio functions. This strategic allocation of processing capabilities is intended to minimize latency, maximize throughput, and optimize overall network performance.

The CU (104) plays a crucial role of overseeing centralized processing tasks and functions within the network. It is usually situated at a centralized data center or core network site and caters to multiple Distributed Units (Dus) dispersed across various locations in proximity to cell sites or radio antennas. The CU (104) performs a range of functions, including Radio Resource Management (RRM), Connection Control (CC), Mobility Management (MM), network-wide coordination, traffic aggregation, and processing.

The LTM does not support inter-CU handover. The legacy handover including the L3 measurements and reporting needs to be supported in case of handover from one cell to another cell, which is outside the configured LTM candidate cell. The legacy handover (L3 mobility) cannot be avoided with the introduction of LTM at L3 measurements, reporting and handover can be performed when the LTM is configured.

Figure 1B:
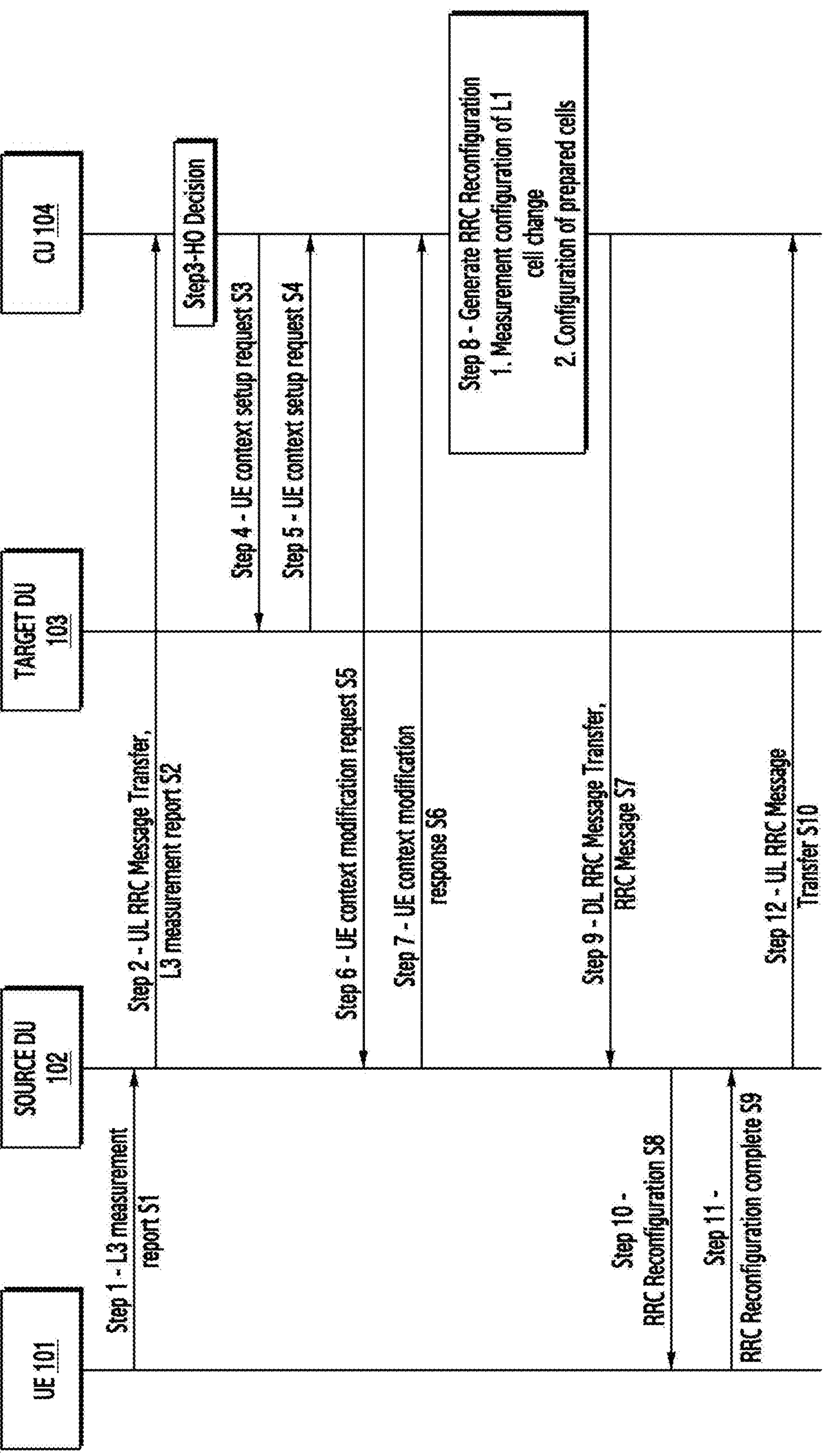
FIG. 1B is a sequence diagram for a L1/L2 triggered mobility procedure in a preparation phase, according to the related art.

FIG. 1B is a sequence diagram for a L1/L2 triggered mobility procedure during the preparation phase, according to the related art.

Referring to FIG. 1B, the wireless network includes a UE (101), a source DU (102), a target DU (103), and a CU (104). The UE can be referred to devices or terminals used by end-users to access communication networks such as mobile networks, the internet, or other telecommunications services. The user equipment can be, but not limited to smartphones, tablets, laptops and notebooks, desktop computers, wearable devices, IoT devices, feature phones, gaming consoles, E-readers, Virtual Reality (VR) and Augmented Reality (AR) headsets.

The source DU (102) constitutes a crucial component of the Radio Access Network (RAN) architecture, forming an integral part of the functional split between the central unit (CU) (104) and the DU (102) in the network's radio interface processing. Positioned in close proximity to the radio units or antennas, the source DU (102) provides vital support for a range of radio functions. This strategic allocation of processing capabilities is intended to minimize latency, maximize throughput, and optimize overall network performance.

The target DU in the network that is being aimed for or designated to handle specific spectrum resources or to support a particular generation of technology (such as 4$^{th}$ Generation (4G) LTE or 5G NR). When a change in spectrum allocation or technology utilization is needed, the network orchestrates the transition of resources from one DU to another.

The CU (104) plays a crucial role of overseeing centralized processing tasks and functions within the network. It is usually situated at a centralized data center or core network site and caters to multiple Distributed Units (Dus) dispersed across various locations in proximity to cell sites or radio antennas. The CU performs a range of functions, including Radio Resource Management (RRM), Connection Control (CC), Mobility Management (MM), network-wide coordination, traffic aggregation, and processing.

At S1, the Long-Term Evolution (LTE) procedure involves the reception of Layer 1 (L1) measurement reports from the User Equipment (UE) by a gNB. This L1/L2 based mobility, also known as Lower Layer Triggered Mobility (LTM), facilitates a seamless transition to a new serving cell via L1/L2 signaling while preserving the upper layer configuration and minimizing changes to the lower layer configuration. This approach effectively reduces latency overhead and interruption time during handover. The LTM supports both Intra-Distributed Unit (DU) and Intra-Central Unit (CU)-Inter-DU mobility, while ensuring that the user plane is maintained wherever possible (e.g. Intra-DU) to avoid data loss and additional delays in data recovery. Notably, security updates are not performed during the LTM process. As illustrated in FIG. 1B, the CU identifies target cells that are served by either the source DU or another DU (i.e. target DU) that are controlled by the same CU.

The LTM, or L1 Triggered Measurement, is a procedure by which the gNB receives reports on L1 measurements from the UE. The gNB then utilizes a MAC CE to issue a cell switch command, designating an LTM candidate cell from the L1 measurement reports, in order to change the serving cell(s) of the UE. Prior to this, the gNB prepares one or more candidate cells and sends the LTM candidate cell configurations to the UE via an RRC signalling message. The cell switch is initiated by the gNB, which selects the indicated LTM candidate cell configuration as the target configuration. The LTM candidate cell configuration can only be added, modified, or released by the network through RRC signalling. This procedure is particularly useful in reducing the mobility latency of the current baseline Handover and supports both intra-gNB-DU, intra-gNB-CU, and inter-gNB-DU mobility. Additionally, the LTM supports inter-frequency mobility, including mobility to an inter-frequency cell that is not the current serving cell.

At S2 Uplink (UL), the transfer of RRC messages is carried out, which includes the L3 measurement report. The procedure for L1/L2 based inter-cell mobility is applicable in various scenarios, including Standalone CA and NR-DC cases where a serving cell change occurs within one CG (cell group), Intra-DU case, and intra-CU inter-DU case (which is applicable for Standalone and CA with no new RAN interfaces expected). This procedure is applicable for both intra-frequency and inter-frequency, as well as both FR1 and FR2. Moreover, it is applicable to both synchronized and non-synchronized source and target cells.

At S3, the UE transmits a request for context setup to the target DU (103), while the response to this request is sent to the CU (104). Whenever a UE moves from one cell or tracking area to another within the network, it transmits a UE Context Setup Request to the Mobility Management Entity (MME) or other related network elements. This request includes information about the UE's identity, current status, and intended movement, requesting the establishment of a context in the new cell or area. Upon receiving the UE Context Setup Request, the core entities of the network, such as the Mobility Management Entity (MME) in LTE or the Access and Mobility Management Function (AMF) in 5G, process the request. The network then responds to the UE's request by sending a UE Context Setup Response.

This correspondence serves as an acknowledgement of the request and provides the essential details for the UE to establish a context in the new cell or area. The reply may encompass crucial parameters that are vital for the UE to configure itself for seamless communication in the new location, including security-related information, radio access configuration, and confirmation of context establishment.

At S5, the UE context modification request is transmitted from the CU (104) to the source DU (102). When a UE moves within the network or experiences certain changes requiring modifications to its context, these messages facilitate the update or adjustment of parameters in the Source DU and CU. The UE Context Modification Request (CMR) is triggered when there's a need to modify the context of the UE that is already connected to the network but undergoing changes, such as handover to a new cell or changes in radio conditions. The CU, responsible for centralized processing and coordination, initiates the context modification request. It communicates with the Source DU, which manages the radio functionalities at the cell site or radio antennas where the UE is currently connected. This request carries information regarding the required modifications, which may include updated radio parameters, mobility-related data, or changes in quality-of-service settings. Upon receiving the UE Context Modification Request, the Source DU processes the request and coordinates with the CU to make the necessary changes in the UE's context. The Source DU sends a UE Context Modification Response back to the CU, confirming the successful implementation of the requested modifications or any failure in the process. This response message includes the outcome of the modification attempt, confirming whether the changes were applied successfully or if there were any issues encountered during the modification process.

At S7, a Downlink (DL) RRC message transfer, RRC message. The RRC reconfiguration is generated to measure configuration of L1 cell change and configuration of prepared cells.

At S8, The RRC configuration is transmitted from the source DU (102) to the UE (101). At S9, the RRC reconfiguration is completed. The RRC reconfiguration is a message sent by the network to the UE to request modifications in the RRC configuration parameters. The message typically contains instructions for the UE to make changes to the radio-related settings, such as handover to a different cell, adjusting radio parameters, or altering the connection setup.

After the UE receives and implements the modifications specified in the RRC reconfiguration message, it responds to the network with the RRC reconfiguration completed message. This message acknowledges successful implementation of the requested changes and confirms that the UE has adjusted its parameters according to the network's instructions.

At S10, the UL RRC message is transmitted to the CU from the source DU.

Figure 2:
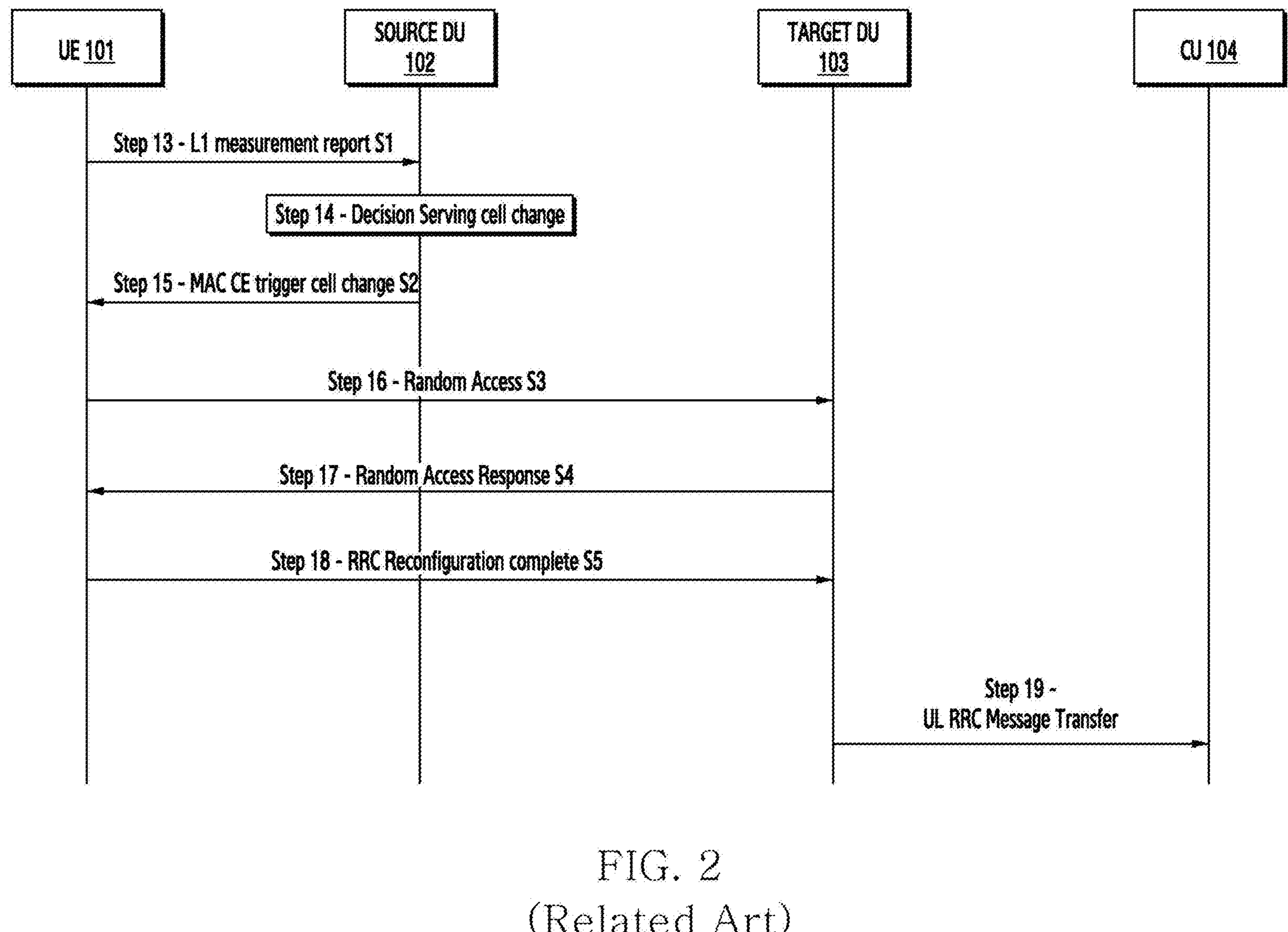
FIG. 2 is a sequence diagram for a L1/L2 triggered mobility procedure in an execution phase, according to the related art.

FIG. 2 is a sequence diagram for the L1/L2 triggered mobility procedure in an execution phase, according to the related art.

Referring to FIG. 2, at S13, the L1 measurement report is sent to the source DU from the UE. At S14, the source DU decides serving cell change.

At S15, the MAC CE trigger cell change is initiated from the source DU. The triggering event can be related to deteriorating signal quality, congestion in the current cell, or other criteria indicating that the UE should move to a different cell for better service quality. The UE performs measurements on neighboring cells to assess their quality and suitability for handover. The measurements may include signal strength, interference levels, and other parameters to evaluate potential target cells.

At S16 and S17, random access request is sent to the target DU and the Random-Access response (RAR) is received from the target DU. When the UE needs to initiate communication with the network (e.g., for the first time or after being idle), it sends a Random-Access Request (RRR). The request is a preamble transmitted by the UE to the base station (eNodeB in LTE or gNB in 5G) indicating its presence and intention to access the network. The RAR typically contains a timing advance value to synchronize the UE's transmission with the network's timing. Upon receiving the Random-Access Request from the UE, the base station responds with a Random-Access Response. The Random-Access Response contains information for the UE, including an identifier, contention resolution information, timing advance adjustments, and sometimes initial access grant for the UE to continue the connection establishment process. This response helps the UE to properly synchronize and access the network resources, allowing further communication establishment procedures to occur. At S18, the RRC Reconfiguration complete is sent to the target DU.

At S19, the UL RRC message is transferred to the CU.

The procedure for LTM is as follows—

The UE sends a MeasurementReport message to the gNB. The gNB decides to use LTM and initiates candidate cell(s) preparation.

The gNB transmits a Reconfiguration message to the UE including the LTM candidate cell configurations of one or multiple candidate cells.

The UE stores the LTM candidate cell configurations and transmits a ReconfigurationComplete message to the gNB.

The UE may perform DL synchronization with candidate cell(s) before receiving the cell switch command. The UE can perform early TA acquisition with candidate cell(s) before receiving the cell switch command.

The UE performs L1 measurements on the configured candidate cell, and transmit lower-layer measurement reports to the gNB.

The gNB decides to execute cell switch to a target cell, and transmits a MAC CE triggering cell switch by including the candidate configuration index of the target cell. The UE switches to the configuration of the target cell.

The UE performs random access procedure towards the target cell, if cell switch needs to include performing random access procedure.

The UE completes the LTM cell switch procedure by sending ReconfigurationComplete message to target cell. For RACH-based LTM, the UE considers that LTM execution procedure is successfully completed when the random access procedure is successfully completed. For RACH-less LTM, the UE considers that LTM execution procedure is successfully completed when the UE determines that the network has successfully received its first UL data.

Figure 3:
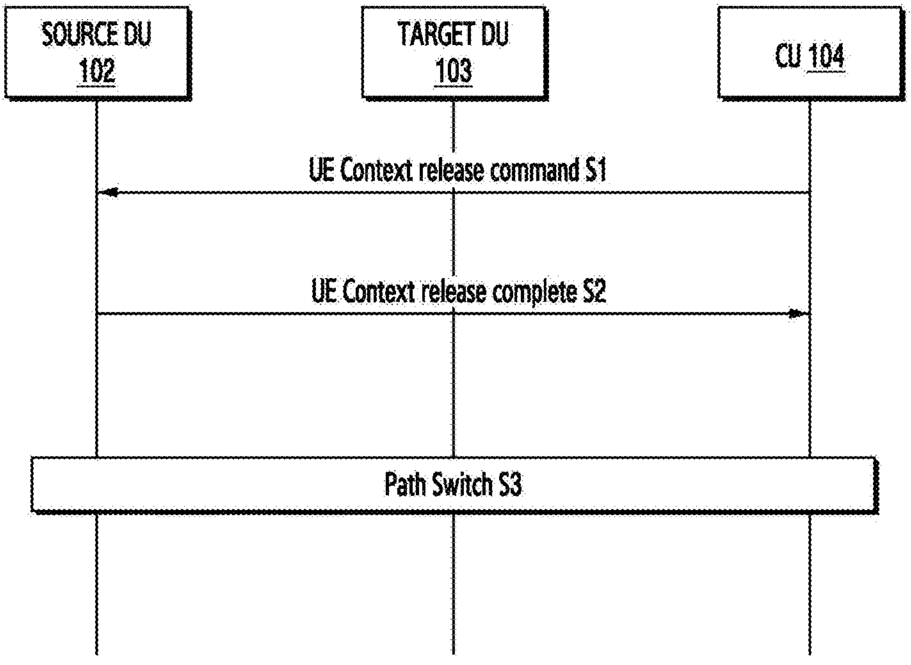
FIG. 3 is a sequence diagram for a L1/L2 triggered mobility procedure in a completion phase, according to the related art.

FIG. 3 is a sequence diagram for a L1/L2 triggered mobility procedure in a completion phase, according to the related art. In a Layer 1 (L1)/Layer 2 (L2) triggered mobility procedure completion phase involving context release command and path switch, several steps occur to finalize the handover process and ensure the seamless transition of the User Equipment (UE) from the source cell to the target cell.

Referring to FIG. 3, at S1, the source cell, upon confirmation of successful path switch preparations in the target cell, sends a Context Release Command to the UE. This command instructs the UE to release its context and terminate its connection with the source cell.

At S2, upon receiving the Context Release Command, the UE initiates the context release procedure. The UE releases the resources associated with the source cell, clears the established connections, and prepares to establish connections with the target cell.

At S3, simultaneously or after the context release procedure, the UE performs the path switch. It starts synchronization and communication procedures with the target cell, establishing a connection and switching its communication path from the source cell to the target cell. Once the UE successfully establishes communication with the target cell, both the UE and the network confirm the handover's success. Context establishment procedures take place in the target cell to ensure that the UE's context and associated information (such as radio parameters, session data, etc.) are updated in the network nodes and the UE itself.

Figure 4:
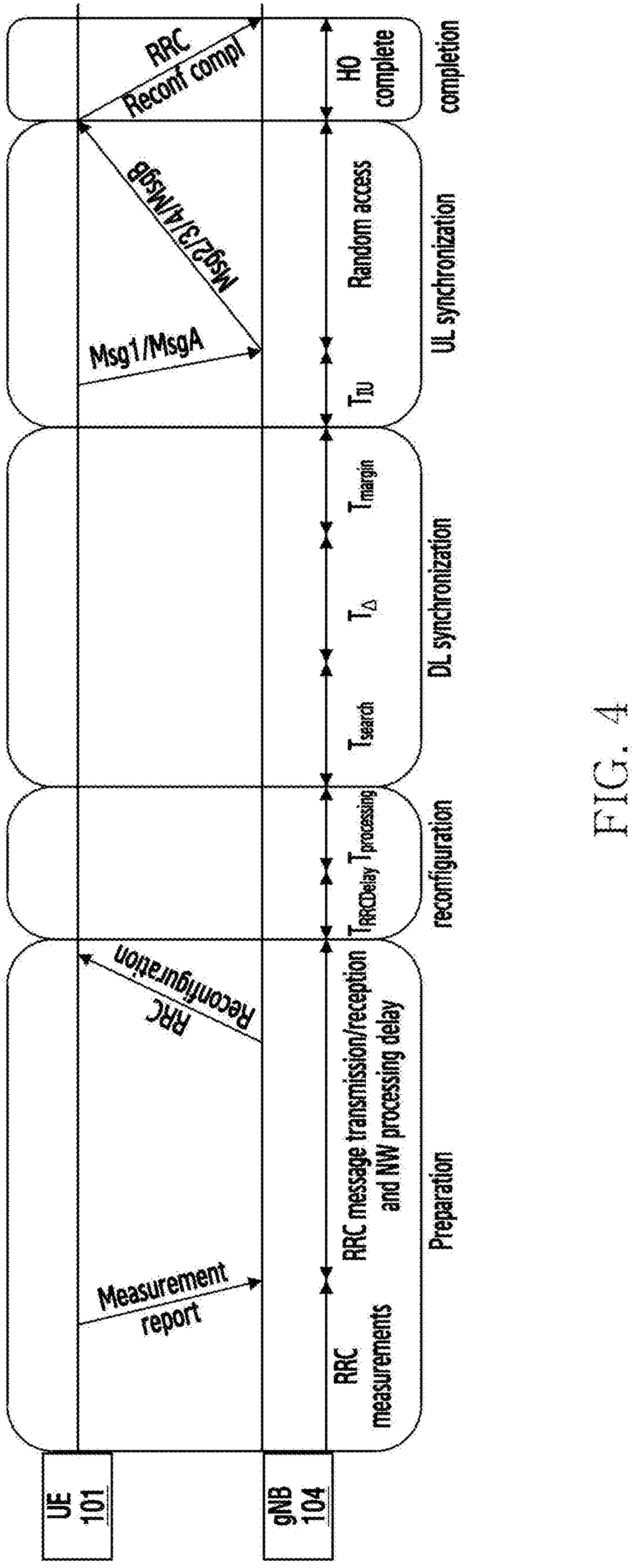
FIG. 4 is a schematic diagram for handover processing time in an LTM procedure, according to the related art.

FIG. 4 is a schematic diagram for handover processing time in an LTM procedure, according to the related art.

Currently, and especially in case of a Primary Cell (Pcell) change, a significant proportion of measurements evaluation, reporting, and reconfiguration and signalling needs to be performed by RRC. In particular, since mobility decisions are taken by the RRC entity of the CU part of a gNB implementation, the UE measurements are reported by RRC to the CU (S1). In addition to that, the measurement report/event handling performed in RRC is designed to provide some level of stability (e.g., via L3 filtering) and robustness (e.g., via Radio Link Control (RLC) retransmissions) when reporting measurements to be used for mobility decisions. The interruption time is the time between end of the last TTI containing the RRC command on the old (i.e., source cell) Physical Downlink Shared Channel (PDSCH) and the time the UE starts transmission of the new Physical Random Access Channel (PRACH), excluding the RRC procedure delay. When intra-frequency or inter-frequency handover is performed, the interruption time shall be less than Tinterrupt, given by:

$$T\text{interrupt}=T\text{search}+TIU+T\text{processing}+\text{T}\Delta+T\text{margin ms}$$

Where, Tsearch is the time required to search the target cell when the target cell is not already known when the handover command is received by the UE.

TΔ is time for fine time tracking and acquiring full timing information of the target cell.

Tprocessing is time for UE processing. Tprocessing can be up to 20 ms.

Tmargin is time for SSB post-processing. Tmargin can be up to 2 ms.

TIU is the interruption uncertainty in acquiring the first available PRACH occasion in the new cell.

LTM does not support inter-CU handover:

| Parameters/Cases | BHO | CHO | L1 |
|---|---|---|---|
| HO Preparation Delay | 40 ms | 40 ms | 40 ms |
| Early Cell Preparation | Not applicable | Enabled | Enabled |
| HO interruption time | 80 ms | 80 ms | 1 ms |
| L3 (IIR) Filter | Enabled for measurement ID used for cell preparation | Enabled for measurement ID used for cell preparation Enabled for measurement ID used for CHO execution | Enabled for measurement ID used for cell preparation. Disabled for HO execution |
| Time-to-Trigger (TTT) for A3 event used for handover execution | 160 ms | 160 ms | Not applicable |
| TTT of A3 event used for early handover preparation | Not applicable | 160 ms | 160 ms |

Figure 5:
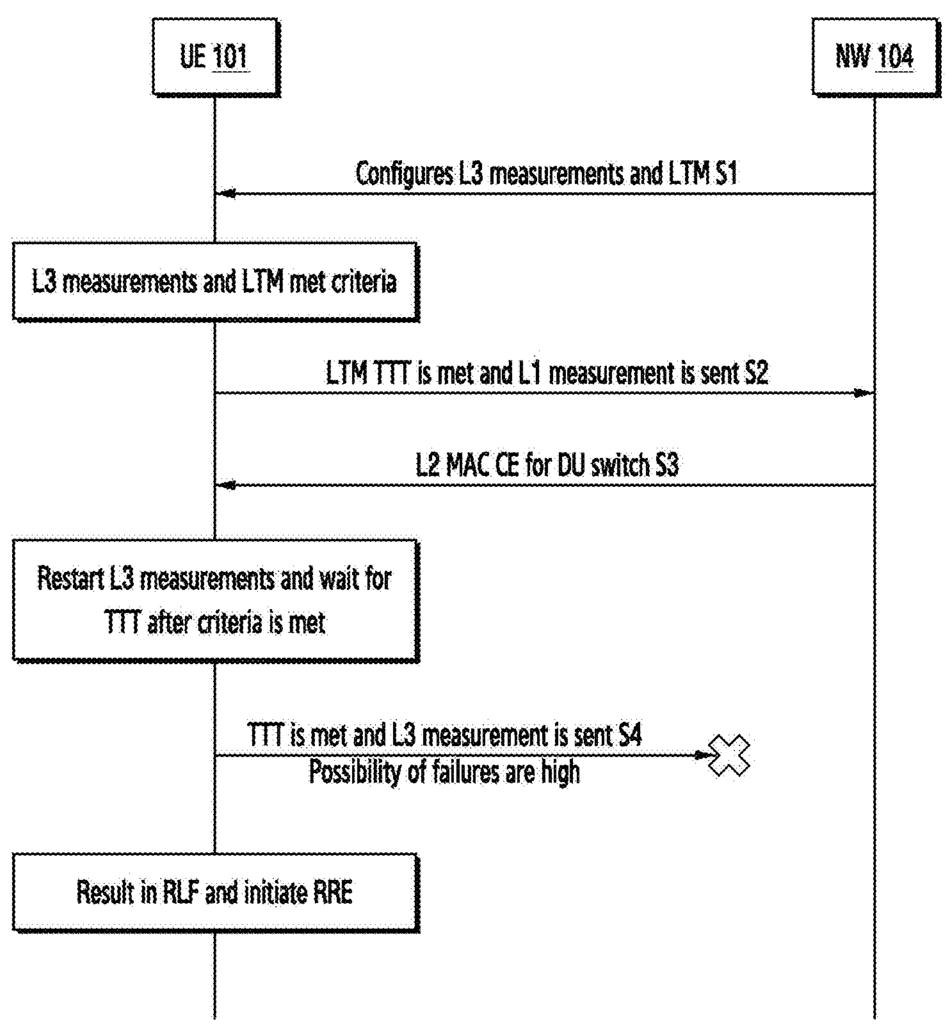
FIG. 5 is a sequence diagram for simultaneous trigger of LTM and legacy L3 measurements, according to the related art.

FIG. 5 is a sequence diagram for simultaneous trigger of the LTM and legacy L3 measurements, according to the related art.

Consider a scenario that involves configuring L3 and LTM measurements at the UE at S1, checking if the LTM TTT criteria are met, and sending L1 measurements at S2, followed by transmission of L2 MAC CE for the DU switch to the UE at S3. The UE then restarts L3 measurements and waits for the TTT criteria to be met. During the transmission of L3 measurements at S4, there is a high possibility of failure resulting in RLF and initiation of RRC re-establishment (RRE). The frequency of LTM cell changes can be higher due to lower latency and shorter measurement evaluation times (e.g., TTT (Time To Trigger)). However, there may be situations where the L3 handover is triggered too early or too late, such as in the case of inter-CU handover. If an LTM cell change occurs during the time-to-trigger for a L3 measurement event, the event may not be triggered, and the L3 evaluation would need to be restarted based on the L3 measurements configured for the new serving cell. This could lead to a delayed inter-CU handover and ultimately result in RLF.

Figure 6:
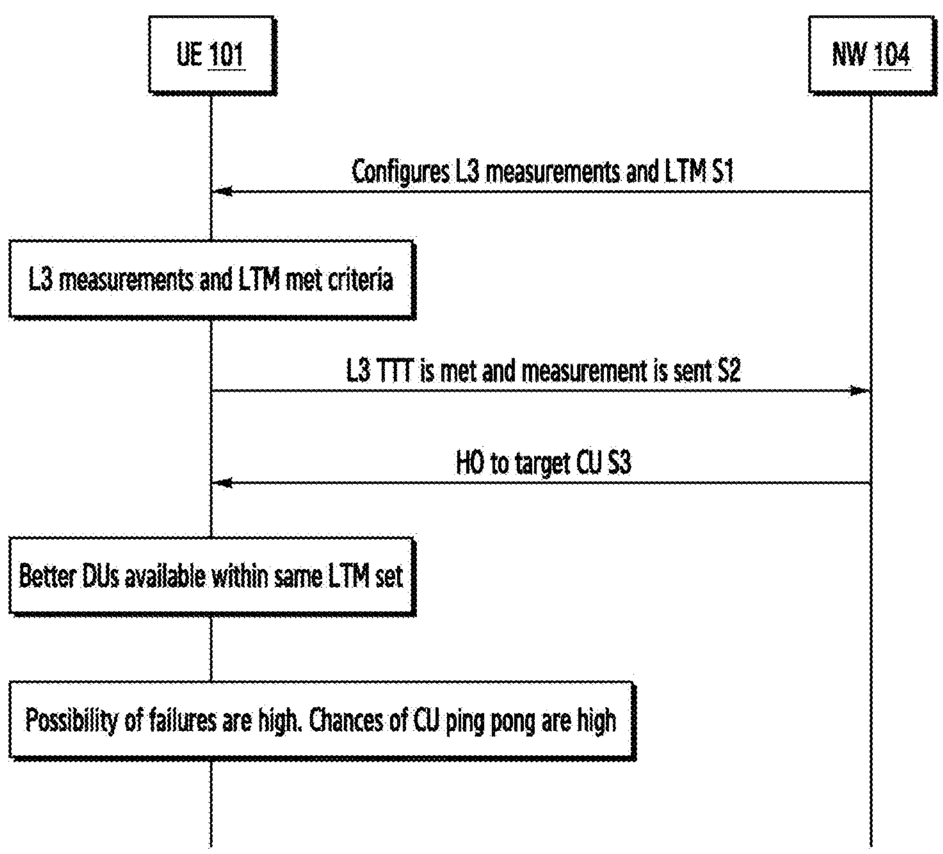
FIG. 6 is a sequence diagram for unnecessary trigger legacy L3 measurements when no suitable LTM candidates are available, according to the related art.

FIG. 6 is a sequence diagram for unnecessary trigger legacy L3 measurements when no suitable LTM candidates are available, according to the related art.

Referring to FIG. 6, at S1, consider a scenario that involves the network that transmits the configures L3 measurements and the LTM to the UE. The L3 measurements and the LTM met criteria.

At S2, the L3 TTT is met and measurement is sent by the UE to the network. At S3, hand over is performed and the handover to the target CU. When better Dus are available within the same LTM set and possibility of failure are high and chances of CU ping pong are high.

The frequency of LTM cell changes is heightened by reduced latency and shorter TTT evaluation times. However, there may arise instances where inter-CU L3 handover is triggered either prematurely or belatedly. The L3 reporting criteria can be tailored to conform to specific events and criteria. Nonetheless, if the set criteria are suboptimal, the reporting criteria may be met even when there exist good beams or DUs within the LTM configuration. In such circumstances, it may not be judicious to transition to another CU or exit the LTM configuration.

The issue at hand lies in the lack of synchronization between L3 and L1 measurements, which operate independently of each other. Consequently, the measurement trigger and reporting are also independent. Moreover, the decision-making process for L3 handover at the NW side is handled by the CU, while the LTM decision is made by the DU, again operating independently of each other. This complete independence between UE and NW procedures may lead to potential failures or performance issues, such as undesirable CU or DU switches.

Figure 7:
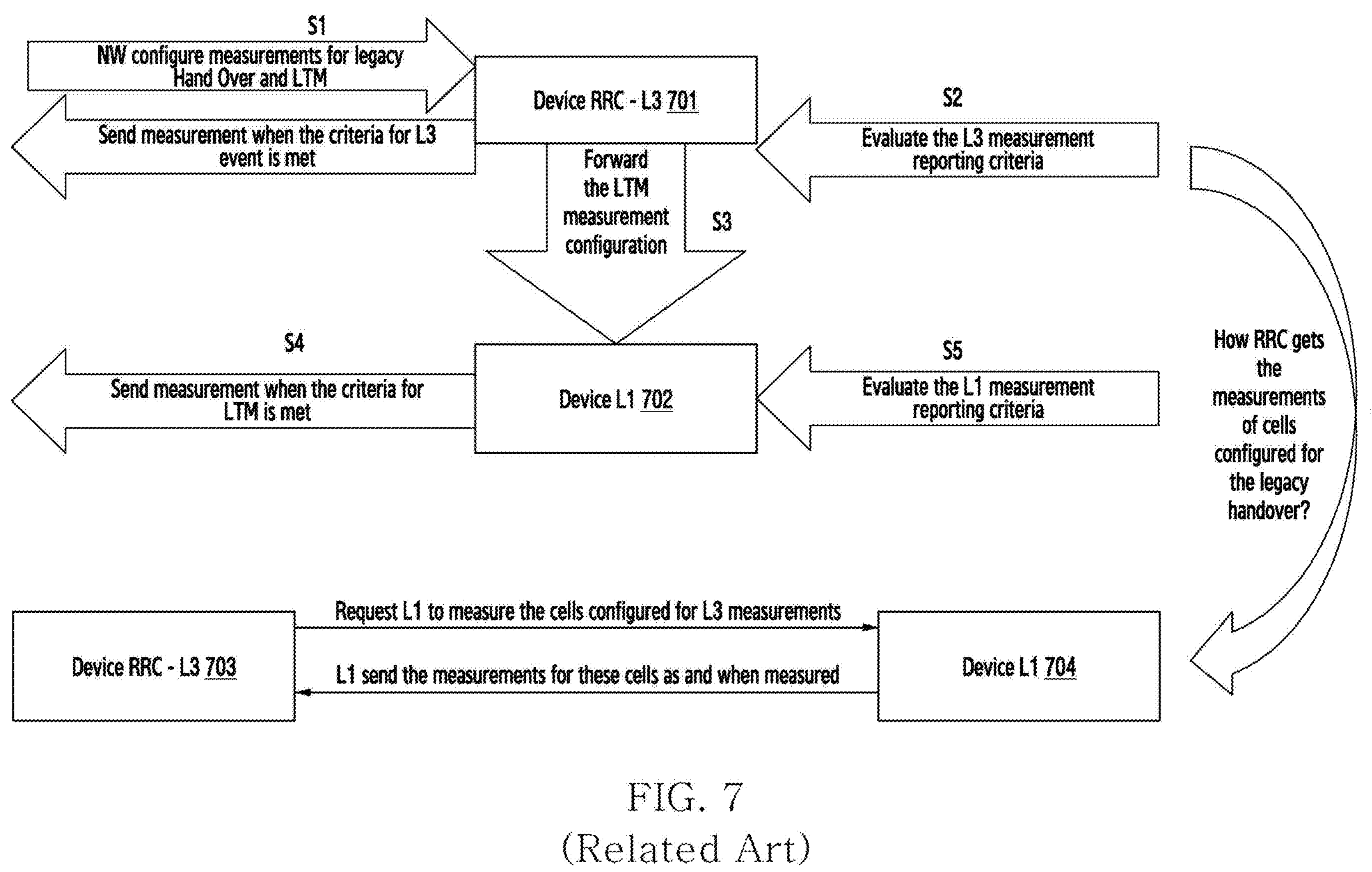
FIG. 7 is a schematic illustrating a handover procedure where measurement reports are transmitted based on reporting criteria, according to the related art.

FIG. 7 is a schematic illustrating the handover procedure where measurement reports are transmitted based on reporting criteria, according to the related art.

Referring to FIG. 7, the schematic includes device RRC-L3 (701), device L1 (702), device RRC-L3 (703) and device L1 (704). The device RRC-L3 (701) may be same as the device RRC-L3 (703). The device L1 (702) may be same as the device L1 (704). The device RRC-L3 receives the network configure measurements for legacy hand over and the LTM at S1 and send the configure measurements when the criteria for L3 event is met. The device RRC-L3 (701) also evaluates the L3 measurement reporting criteria at S2.

At S3, the LTM measurement configuration is forwarded to the device L1 (702). The device L1 (702) sends the measurement, when the criteria for the LTM is met and evaluate the L1 measurement reporting criteria.

The NW sends legacy and LTM measurement configuration to UE (RRC message) (S1). The RRC forwards the LTM measurement configuration to L1. The RRC send the list of cells to L1 for performing the legacy measurements and L1 measures the cells configured for LTM and legacy measurements (S4 and S5).

The L1 send the measurements of the cells configured for legacy measurements to device RRC-L3 and the device RRC-L3 sends the measurement report to CU when the legacy reporting criteria is met. The L1 sends the measurement report to DU if LTM reporting criteria is met.

Figure 8:
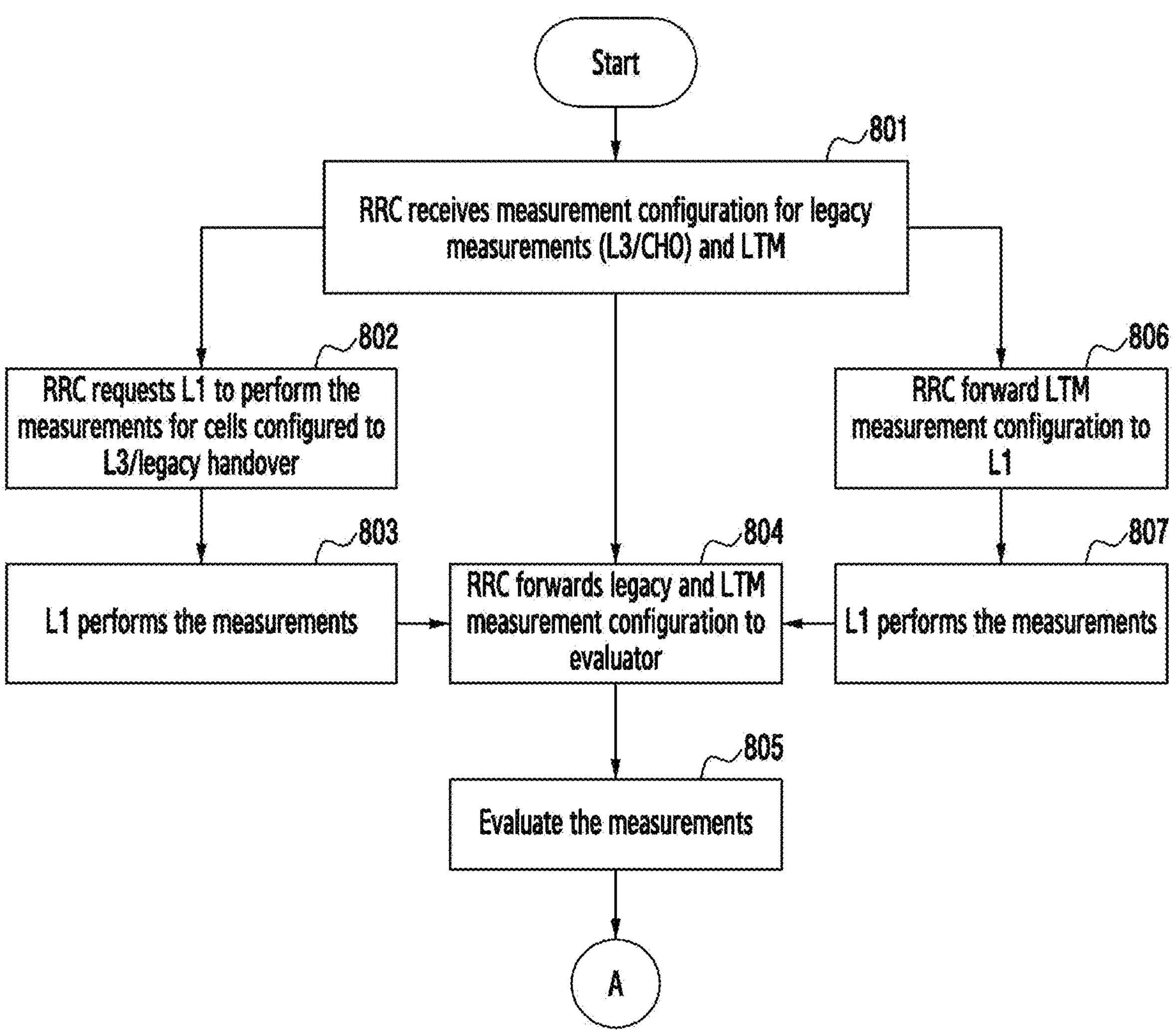
FIG. 8 is a flow diagram illustrating a procedure to transmit layer 1 and LTM measurement reports, according to an embodiment of the disclosure.

FIG. 8 is a flow diagram illustrating a procedure to transmit layer 1 and LTM measurement reports, according to an embodiment of the disclosure.

In one embodiment, Layer 3 is commonly referred to as L3, L3 UE, or L3 RRC UE, while Layer 1 is often referred to as L1 or L1 UE. The L3 and the L1 may be included in the UE.

Referring to FIG. 8, at operation 801, the RRC receives measurement configuration for legacy measurements (L3/CHO) and the LTM. The network transmits the L3 measurement reporting and L1 measurement reporting configuration via message, with the L3 measurement configuration being stored in the L3 measurement and the L1 measurement configuration (for LTM) being forwarded to the L1 in the UE.

Upon receiving a request at operation 802, the RRC layer in the UE instructs the lower layers (L1/L2) of the protocol stack, specifically Layer 1, to conduct measurements on neighboring cells or gNB that are configured for L3 or legacy handover procedures. This request is made to gather measurements or information about neighboring cells that are configured for L3/legacy handover. The L1 layer, responsible for physical layer functionalities such as modulation, demodulation, and signal processing, executes the measurement procedure as instructed by the RRC layer.

The UE performs measurements on the radio signals received from neighboring cells that are set up for L3/legacy handover, evaluating the quality and characteristics of these cells. These measurements might include parameters such as signal strength, signal quality, interference levels, and other factors relevant to determining the suitability of neighboring cells for potential handover.

Based on the measurements performed by the UE's L1 layer, the RRC layer can make informed decisions regarding potential handovers at operation 803. If the measurements indicate that a neighboring cell configured for L3/legacy handover provides better signal quality or other favorable conditions, the network might consider initiating a handover for the UE to improve its connection quality or other network-related criteria.

Figure 11:
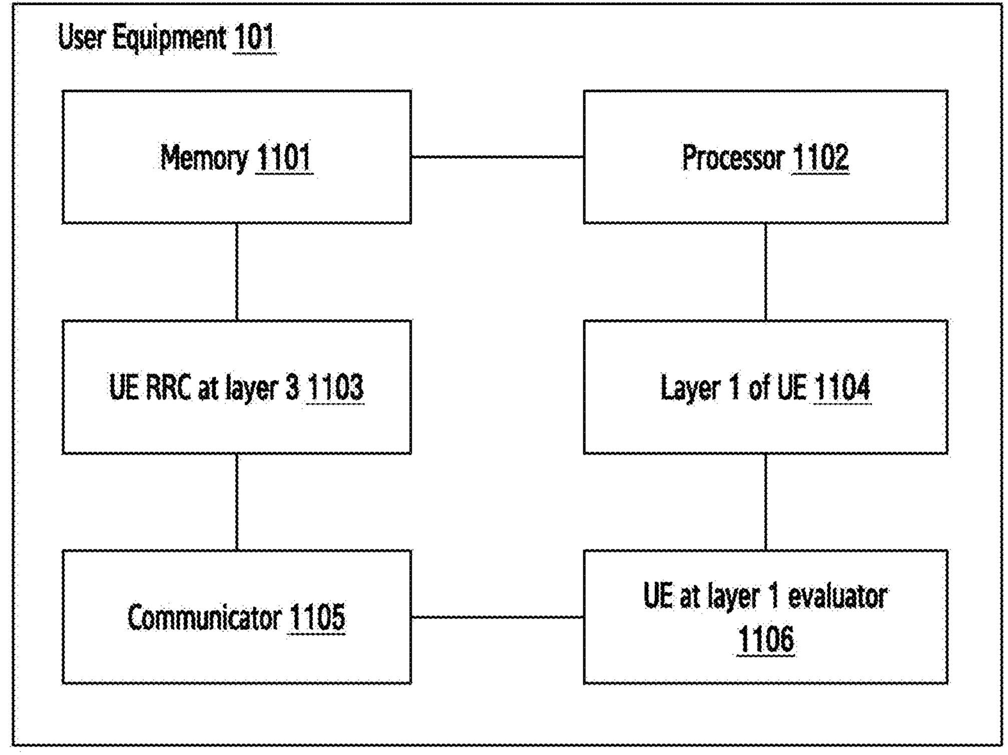
FIG. 11 is a block diagram illustrates handling a layer 3 and an LTM measurement in the wireless networks, according to an embodiment of the disclosure.

At operation 804, the L1 layer performs the measurements and forwards the legacy and LTM measurement configuration to the UE layer 1 evaluator (1106) in FIG. 11.

The network transmits the L3 measurement reporting and L1 measurement reporting configuration via the RRC message. The L3 measurement configuration is stored within the UE L3, while the L1 measurement configuration (pertaining to LTM) is relayed to L1. Additionally, a duplicate of the L3 measurement configuration shall be dispatched to UE L1 at operations 803 and 804.

At operation 805, the L1 commences its evaluation of the cells that have been configured for legacy handover and LTM in parallel. The following scenarios may arise: L3 measurements alone meet the reporting criteria, LTM measurements alone meet the reporting criteria, both L3 and LTM measurements meet the reporting criteria, or no cells meet the reporting criteria. Based on various conditions, the L1 will determine whether to send the L1 measurement report to DU or indicate the L3 measurements to RRC to govern the cell switch.

The RRC requests the L1 to perform the measurement for cells configured to L3/legacy handover and the RRC forward LTM measurement configuration to the L1 at operation 806. The L1 performs the measurements related to the LTM measurement configuration at operation 807. The measurements can be for assessing the quality of the received signals, evaluating the radio environment, and aiding in decisions related to connectivity, handover, and resource allocation. The L1 can measure but not limited to a Received Signal Strength Indicator (RSSI), a Signal to Interference plus Noise Ratio (SINR), Channel Quality Indicators (CQI), interference levels, timing and synchronization parameters, and the like.

In an embodiment, a layer 1 of UE is interchangeably referred as UE at layer 1.

In an embodiment, a layer 3 of UE is interchangeably referred as UE at layer 3 or a layer 3 RRC, or a UE RRC at layer 3.

In an embodiment, the layer 1 is interchangeably referred as L1 and layer 3 is interchangeably referred as L3.

Figure 9:
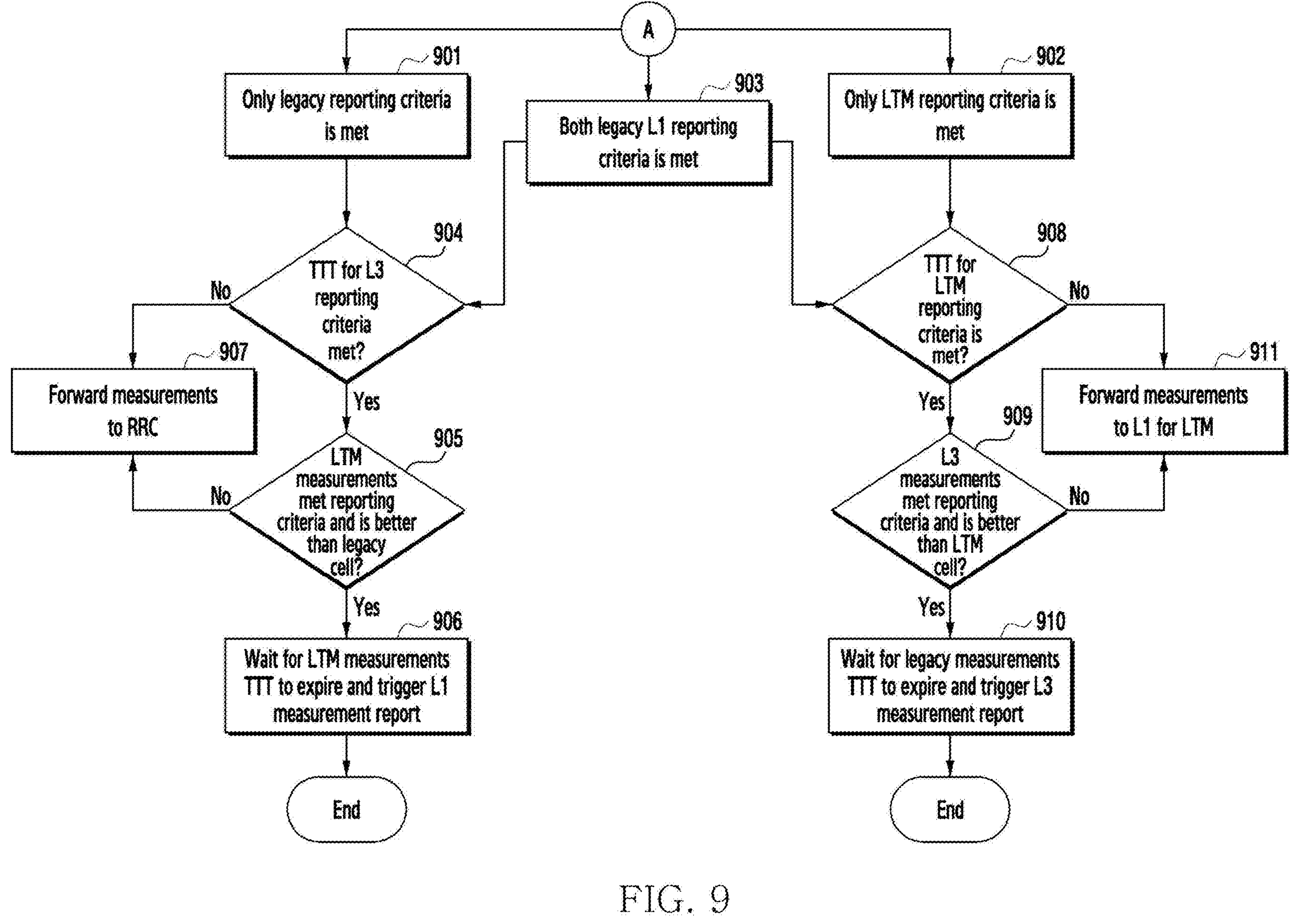
FIG. 9 is a schematic illustrates handling layer 3 and LTM measurement in wireless networks, according to an embodiment of the disclosure.

FIG. 9 is a schematic illustrates handling layer 3 and LTM measurement in wireless networks, according to an embodiment of the disclosure.

At device side both L3 and L1 (the UE L3 and UE L1) measurements and reporting are to be in sync. The decision of the L3 or the LTM reporting is considered to make sure the performance is best.

Referring to FIG. 9, the network sends the L3 measurement reporting and L1 measurement reporting configuration through the RRC message.

In typical case, the L3 measurement configuration is stored in the L3 and the L1 measurement configuration (for LTM) are forwarded to the UE L1. The device L1 and UE L1 are interchangeably referred in the specification. The device L3 and the UE L3 are interchangeably referred in the specification.

The L3 evaluates the measurements for legacy measurement and decide when to send the measurement report for legacy handover. The L1 evaluates the measurements for the LTM and decide when to send the measurement report for LTM.

In the proposed solution, the L3 measurement configuration for the legacy handover and the L1 measurement configuration for LTM will be evaluated together. The UE makes sure that the measurement report is only sent for the best cell and choose the best option between the legacy handover and LTM in all cases.

The network sends the L3 measurement reporting and the L1 measurement reporting configuration through the RRC message. The network referred in the proposed method can be a base station, NodeB, gNB, CU and the like.

The RRC (or the UE, the UE L3, L3, RRC of the UE) requests L1 (or the UE, the UE L1, L1, L1 of the UE) to perform measurements for cells configured for L3/legacy handover and LTM measurement configuration to the L1. The L1 performs both the measurements and forwards the measurement results to and evaluator. The evaluator (or the UE L1 evaluator, the UE, evaluator of the UE, L1 evaluator of the UE) evaluates the measurements of all cells detected at operations 901, 902, and 903.

When only legacy reporting criteria is met at operation 901 and when TTT (time to trigger) for L3 reporting criteria is met at operation 904, the UE (or the UE L1 evaluator) checks if any LTM measurement reporting criteria is met and if it (e.g., L1 cell or LTM cell) is better than the legacy measured cell at operation 905. If yes at operation at 905, the UE (or the UE L1 evaluator) waits for TTT for LTM measurements and triggers L1 measurement report at operation 906. If TTT for L3 reporting is not met at operation 904, or the LTM measurement reporting criteria is not met and if it (e.g., L1 cell or LTM cell) is not better than (or below than) the legacy cell at operation 905, the UE (or the UE L1 evaluator) forwards the measurements to RRC for legacy reporting at operation 907. When only LTM reporting criteria is met at operation 902, and if TTT (time to trigger) for LTM reporting criteria is met at operation 908, the UE (or the UE L1 evaluator) checks if any legacy measurement reporting criteria is met and if it (e.g., legacy cell or L3 cell) is better than the LTM measured cell at operation 909. If yes at operation 909, then the UE (or the UE L1 evaluator) waits for TTT for legacy measurements and triggers L3 measurement report at operation 910. If TTT for LTM reporting is not met at operation 908, or the legacy measurement reporting criteria is not met and if it (e.g., legacy cell or L3 cell) is not better than (or below than) the LTM cell, the UE (or the UE L1 evaluator) forwards the measurements to L1 for LTM reporting at operation 911.

If both legacy and LTM criteria are met at operation 903, if TTT (time to trigger) for L3 reporting criteria is met at operation 904, then the UE (or the UE L1 evaluator) checks if any LTM measurement reporting criteria is met and if it (e.g., L1 cell or LTM cell) is better than the legacy measured cell at operation 905. If yes at operation at 905, the UE (or the UE L1 evaluator) waits for TTT for LTM measurements and triggers L1 measurement report at operation 906. If the LTM measurement reporting criteria is not met and if it (e.g., L1 cell or LTM cell) is not better than (or below than) the legacy measured cell at operation 905, the UE (or the UE L1 evaluator) forwards the measurements to RRC for legacy reporting at operation 907. If TTT (time to trigger) for the LTM reporting criteria is met at operation 908, the UE (or the UE L1 evaluator) checks if any legacy measurement reporting criteria is met and if it (e.g., legacy cell or L3 cell) is better than the LTM measured cell at operation 909. If yes at operation 909, then the UE (or the UE L1 evaluator) waits for TTT for legacy measurements and triggers L3 measurement report at operation 910. If the legacy measurement reporting criteria is not met and if it (e.g., legacy cell or L3 cell) is not better than (or below than) the LTM cell, the UE (or the UE L1 evaluator) forwards the measurements to L1 for LTM reporting at operation 911.

It is to be noted that the TTT (time to trigger) setting for LTM will be comparatively shorter than that of the traditional measurements (e.g., TTT setting for legacy measurement).

Figure 10:
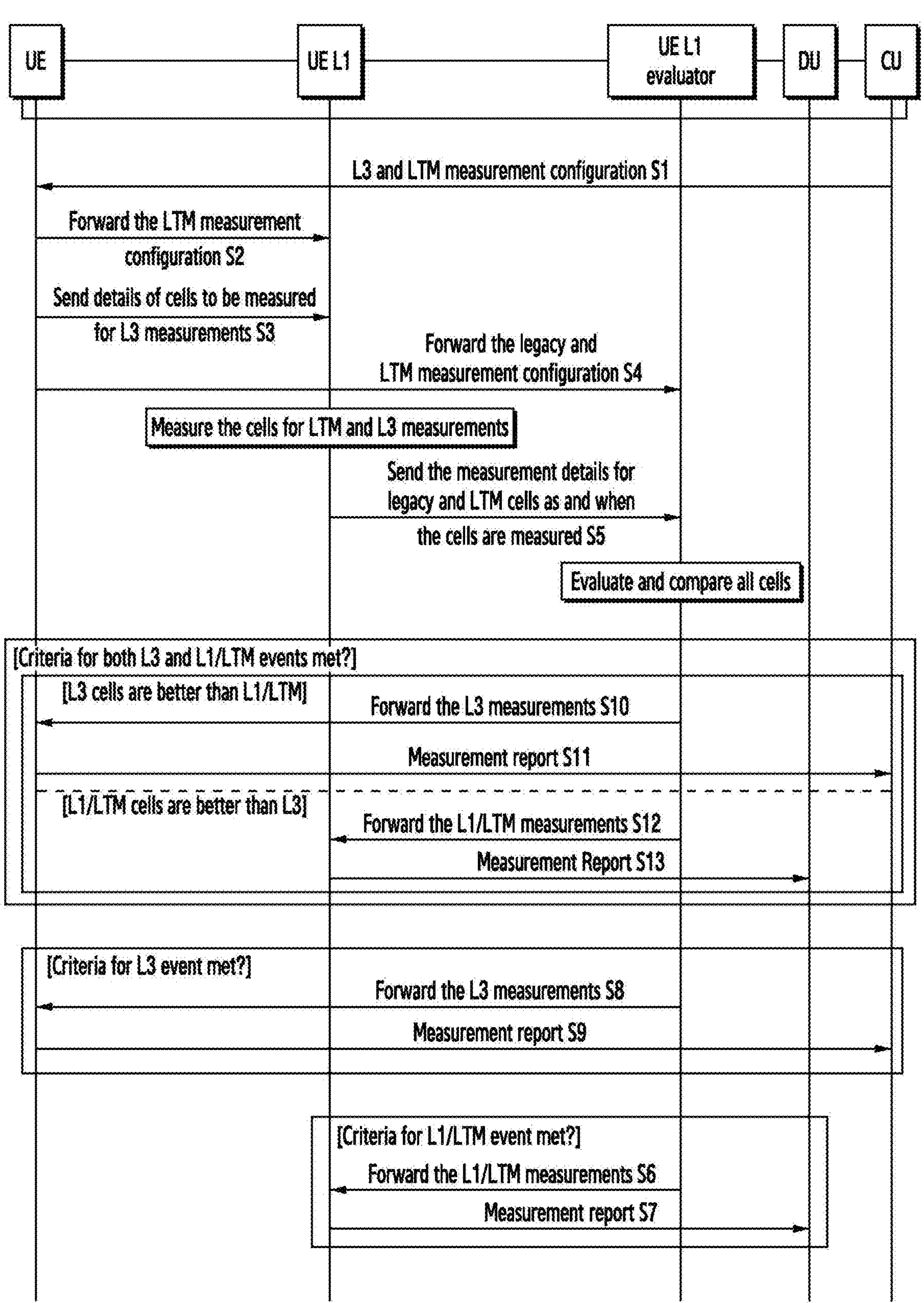
FIG. 10 is a sequence diagram illustrates handling the layer 3 and the LTM measurement in the wireless networks, according to an embodiment of the disclosure.

FIG. 10 is a sequence diagram illustrates handling a layer 3 and an LTM measurement in the wireless networks, according to an embodiment of the disclosure.

Referring to FIG. 10, at S1, the CU transmits the L3 and LTM measurement configurations to the UE (or the UE L3), while the network apparatus or CU in the wireless network sends the L3 and LTM measurement reporting configurations. At S2, the UE forwards to the UE L1 the LTM measurement configuration, followed by sending details of cells to be measured for L3 measurements at S3. At S4, the legacy and LTM measurement configurations are forwarded to the UE L1 evaluator, where both measurements are used to measure the cells for LTM and L3 measurements. As cells are measured, measurement details for legacy and LTM cells are sent to the UE L1 evaluator at S5. The evaluator then evaluates and compares all cells.

The NW transmits the legacy and LTM measurement configuration to UE via an RRC message. The RRC then relays the LTM measurement configuration to L1 and also to the evaluator, along with the legacy measurement configuration. The RRC sends a list of cells to L1 for executing the legacy measurements. The list of cells is referred as the details of cells to be measured for L3 measurements. Subsequently, L1 sends the measurements from both the legacy and LTM configurations to the evaluator, who determines the most suitable cell (either legacy or LTM) for handover. If the evaluator determines that the legacy measurement-configured cell is superior to all other cells, it relays the measurements to the RRC.

At S6, the evaluator sends the measurements to the L1 if it finds the LTM measurement configured cell is better out of all cells.

At S7, the L1 sends the measurement report to the DU, if the LTM measurement configuration cell is best out of all.

At S8 and S9, in a condition where-only L3 measurements meet the criteria and TTT for L3 measurement expired and when LTM measurements met the LTM measurement reporting criteria and if TTT for the LTM is running and if the cell (e.g., L1 cell, or LTM cell) is better than the L3 measured cell at this time, the UE (or the evaluator) holds sending the measurement information to L3, and waits for TTT to expire for the LTM measurements and sends the LTM measurements to L1 for LTM measurement reporting, else (or at any time, the LTM cell goes below the criteria), the UE (or the evaluator) indicates the measurements to L3 for the legacy measurement reporting.

At S9, in an instance only L3 measurements meet the criteria and TTT for LTM measurement expired—NA (no action) as this is the case only L3 measurement meeting.

At S6 and S7, in another instance, only LTM measurements meet reporting criteria and TTT for L3 measurements expired—NA (no action) as this is the case of only L3 measurement meeting. And when TTT for LTM measurements expired—if L3 measurements met the L3 measurement criteria for reporting and if TTT for L3 is running and if the cell (e.g., L3 cell or legacy cell) is better than the LTM measured cell at this time, the UE (or the evaluator) holds sending the measurement information to the DU, and waits for TTT for L3 measurement to expire and send the L3 measurements to L3 for legacy measurement reporting, else (or at any time, the L3 cell goes below the criteria), the UE sends the L1 measurements to the DU for LTM. For example, the UE (or the evaluator) sends the L1 measurements to the L1 for LTM measurement reporting.

At S10-S13, both L3 and LTM measurements meet reporting criteria and TTT for L3 measurement expired—if LTM cell is better than the L3 measured cell at this time, the UE (or the evaluator) holds sending the measurement information to L3, and waits for TTT to expire for LTM measurements and sends the measurements for LTM to L1, else (or at any time, the LTM cell goes below the criteria), the UE (or the evaluator) indicates the measurements to L3 for legacy measurement reporting. And when TTT for LTM measurements expired—if L3 cell is better than the LTM measured cell at this time, the UE (or the evaluator) holds sending the measurement information to DU, and waits for TTT for L3 measurement to expire and sends the measurements to L3 for legacy measurement reporting, else (or at any time, the L3 cell goes below the criteria), the UE sends the measurements to DU for LTM. For example, the UE (or the evaluator) sends the L1 measurements to the L1 for LTM measurement reporting.

In yet another instance, when no cells meet reporting criteria, in both TTT for L3 measurements expired and TTT for LTM measurements expired, no actions are taken.

FIG. 11 is a block diagram illustrates handling a layer 3 and an LTM measurement in the wireless networks, according to an embodiment of the disclosure.

Referring to FIG. 11, the UE (101) includes memory (1101), a processor (1102), a communicator (1105), a layer 3 RRC (1103) and a layer 1 of UE (1104).

The memory (1101) is configured to store instructions to be executed by the processor (1102). The memory (1101) can include non-volatile storage elements. Examples of such non-volatile storage elements may include magnetic hard disks, optical discs, floppy disks, flash memories, or forms of electrically programmable ready only memories (EPROMs) or electrically erasable and programmable ROM (EEPROM) memories. In addition, the memory (1101) may, in some examples, be considered a non-transitory storage medium. The term "non-transitory" may indicate that the storage medium is not embodied in a carrier wave or a propagated signal. However, the term "non-transitory" should not be interpreted that the memory (1101) is non-movable. In some examples, the memory (1101) is configured to store larger amounts of information. In certain examples, a non-transitory storage medium may store data that can, over time, change (e.g., in Random Access Memory (RAM) or cache).

The processor (1102) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor (1102) such as a neural processing unit (NPU). The processor (1102) may include multiple cores and is configured to execute the instructions stored in the memory (1101). The processor (1102) according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The communicator (1105) includes an electronic circuit specific to a standard that enables wired or wireless communication. The communicator (1105) is configured to communicate internally between internal hardware components such as for example the memory (1101), the processor (1102), the layer 3 RRC (1103) and the layer 1 of UE (1104) and with external devices via one or more networks.

The layer 3 RRC (1103) is responsible for triggering the handover. The layer 3 event evaluation needs to restart based on the layer 3 measurements configured for the new serving cell. The network sends the layer 3 measurement reporting and layer 1 measurement reporting configuration through the RRC message. The layer 3 measurements are stored in layer 3 RRC (1103) and layer 1 measurement configuration is forwarded to the layer 1. The layer 3 evaluate the legacy measurement and decide when to send the measurement report for legacy handover. In the layer 3 measurement configuration for legacy handover and layer 1 measurement configuration is evaluated together.

The layer 1 of the UE (1104) evaluate the measurements for the LTM and decide when to send the measurement report for the LTM.

The network sends the layer 3 measurement reporting and layer 1 measurement reporting configuration through the RRC message and the RRC requests layer 1 to perform measurements for cells configured for layer 3/legacy handover and the LTM measurement configuration to the layer 1. The layer 1 perform both the measurements and forward the measurement results to UE at layer 1 evaluator (the evaluator) (1106). The evaluator (1106) evaluates the measurements of all the cells detected and if only legacy reporting criteria is met and if time to trigger (TTT) for layer 3 reporting criteria is met, then check if any LTM measurement reporting criteria is met and whether the LTM measurement reporting criteria is better than the legacy measured cell. If yes, wait for TTT for the LTM measurements and forward the measurements for LTM reporting. When only LTM reporting criteria is met, if time to trigger (TTT) for LTM reporting criteria is met, check if any legacy measurement reporting criteria is met and if it is better than the LTM measured cell. If yes, wait for TTT for legacy measurements and forward the measurements to RRC for legacy reporting. If both legacy and LTM criteria are met and if time to trigger (TTT) for L3 reporting criteria is met, check if any LTM measurement reporting criteria is met and if it is better than the legacy measured cell. If yes, wait for TTT for LTM measurements and forward the measurements for LTM reporting.

If the TTT (time to trigger) and the LTM reporting criteria is met, check whether the legacy measurement reporting criteria is met and if the legacy measurement reporting criteria is better than the LTM measured cell. If yes, wait for the TTT for legacy measurements and forward the measurements to the RRC for legacy reporting. The TTT (time to trigger) configured for LTM, when the LTM is smaller than the legacy measurements.

The proposed disclosure offers significant advantages to the UEs (101) by enabling them to consistently select the optimal measurement configuration such as legacy or LTM—thereby minimizing lower layer failures and ensuring the user always receives the highest quality of service. This approach guarantees that the device remains connected to the best cell at all times. The proposed solutions are highly beneficial for the UEs (101) to make sure that the UE (101) always choose the best among legacy and LTM measurement configurations to reduce the number of lower layer failures. The proposed solution makes sure that the user gets best quality of service (QOS) as the UE (101) always remain in best cell.

According to embodiments, a method performed by a user equipment (UE) for handling layer 3 handover and layer 1/layer 2 triggered mobility (LTM) measurement in a wireless network, the method may comprise receiving, by the UE, layer 3 measurement reporting configuration and LTM measurement reporting configuration from a centralized unit (CU) of a network apparatus in the wireless network. The method may comprise determining, by the UE (101), measurements for cells configured for the layer 3 handover at the layer 1 of the UE (101) based on the layer 3 measurement reporting configuration, and measurements for cells configured for the LTM measurement at the layer 1 of the UE (101) based on the LTM measurement reporting configuration. The method may comprise determining, by the UE (101), at least one layer 3 measurement for the cells configured for the layer 3 handover meets the layer 3 measurement reporting criteria, and the LTM measurement for the cells configured for the LTM measurement meets the LTM reporting criteria. The method may comprise transmitting, by the UE (101), one of the layer 3 measurement to the CU of the network apparatus when the layer 3 measurement for the cells configured for the layer 3 handover meets the layer 3 measurement reporting criteria, or the LTM measurement to a distributed unit (DU) of the network apparatus when the LTM measurement for the cells configured for the LTM measurement meets the LTM measurement reporting criteria.

In an embodiment, in case that the layer 3 measurement reporting criteria is met, the method may further comprise determining, by the UE, whether a time to trigger (TTT) for the layer 3 measurement reporting criteria is met. In case that the layer 3 measurement reporting criteria is met, the method may further comprises in case that the TTT for the layer 3 measurement reporting criteria is met: checking whether LTM measurement reporting criteria is met, and whether the LTM measurement is better than the layer 3 measured cell to forward the LTM measurements for LTM reporting; and in case that the LTM measurement reporting criteria is not met, or the LTM measurement is not better than the layer 3 measured cell to forward the LTM measurements for LTM reporting, forwarding, by the UE, the LTM measurements to a radio resource control (RRC) for LTM reporting. In case that the layer 3 measurement reporting criteria is met, the method may further comprise in case that the TTT for the layer 3 measurement reporting criteria is not met, forwarding, by the UE, the LTM measurements to RRC for LTM measurement reporting.

In an embodiment, the determining, by the UE, that the layer 3 measurement reporting criteria is met may comprise waiting for the TTT for the LTM measurements before forwarding the LTM measurements for LTM reporting.

In an embodiment, in case that the LTM measurement reporting criteria is met, the method may further comprise determining, by the UE, whether a time to trigger (TTT) for the LTM measurement reporting criteria is met. In case that the LTM measurement reporting criteria is met, the method may further comprise in case that the TTT for the LTM measurement reporting criteria is met: checking whether the layer 3 measurement reporting criteria is met, and whether the layer 3 measurement is better than LTM measured cell to forward the layer 3 measurements for layer 3 reporting; and in case that the layer 3 measurement reporting criteria is not met, or the layer 3 measurement is not better than LTM measured cell to forward the layer 3 measurements for layer 3 reporting, forwarding, by the UE, the layer 3 measurements to layer 1 for the LTM reporting. In case that the LTM measurement reporting criteria is met, the method may further comprise in case that the TTT for the LTM measurement reporting criteria is not met, forwarding, by the UE, the layer 3 measurements to layer 1 for the LTM reporting.

In an embodiment, the determining, by the UE, that the LTM measurement reporting criteria is met may comprise waiting for the TTT for the layer 3 measurements before forwarding the layer 3 measurements for layer 3 reporting.

In an embodiment, the determining, by the UE, at least one of the layer 3 measurement for the cells configured for the layer 3 handover meets the layer 3 measurement reporting criteria, or that the LTM measurement for the cells configured for the LTM measurement meets the LTM reporting criteria may comprise determining, by the UE, that both the layer 3 measurement reporting criteria and the LTM measurement reporting criteria are met. The determining, by the UE, at least one of the layer 3 measurement for the cells configured for the layer 3 handover meets the layer 3 measurement reporting criteria, or that the LTM measurement for the cells configured for the LTM measurement meets the LTM reporting criteria may comprise determining, by the UE, whether a time to trigger (TTT) for the layer 3 measurement reporting criteria is met. The determining, by the UE, at least one of the layer 3 measurement for the cells configured for the layer 3 handover meets the layer 3 measurement reporting criteria, or that the LTM measurement for the cells configured for the LTM measurement meets the LTM reporting criteria may comprise in case that the TTT for the layer 3 measurement reporting criteria is met: checking whether the LTM measurement reporting criteria is met, and whether the LTM measurement reporting criteria is better than the layer 3 measured cell; and in case that the LTM measurement reporting criteria is met and the LTM measurement reporting criteria is better than the layer 3 measured cell, waiting for a TTT for the LTM measurements before forwarding the LTM measurements for LTM reporting. The determining, by the UE, at least one of the layer 3 measurement for the cells configured for the layer 3 handover meets the layer 3 measurement reporting criteria, or that the LTM measurement for the cells configured for the LTM measurement meets the LTM reporting criteria may comprise in case that the LTM measurement reporting criteria is not met or the LTM measurement reporting criteria is not better than the layer 3 measured cell, forwarding, by the UE, the LTM measurements to a radio resource control (RRC) for LTM measurement reporting. The determining, by the UE, at least one of the layer 3 measurement for the cells configured for the layer 3 handover meets the layer 3 measurement reporting criteria, or that the LTM measurement for the cells configured for the LTM measurement meets the LTM reporting criteria may comprise in case that the TTT for the layer 3 measurement reporting criteria is not met, forwarding, by the UE, the LTM measurements to the RRC for the layer 1 reporting.

In an embodiment, the determining, by the UE, that both the LTM measurement reporting criteria are met and the layer 3 measurement reporting criteria is met may comprise waiting for the TTT for the LTM measurements before forwarding the LTM measurements for LTM reporting.

In an embodiment, the method may further comprise determining, by the UE, that both the LTM measurement reporting criteria and the LTM measurement reporting criteria are met to perform one of: determining, by the UE, whether the TTT for the LTM measurement reporting criteria is met, checking whether the layer 3 measurement reporting criteria is met, and whether the layer 3 measurement reporting criteria is better than the LTM measured cell then waiting for the layer 3 measurements; and forwarding, by the UE, the layer 3 measurements for layer 3 measurement reporting, when the criteria is met, or forwarding, by the UE, the layer 3 measurements to layer 1 for the LTM reporting, when no criteria is met.

In an embodiment, the determining, by the UE, that both the LTM measurement reporting criteria and the layer 3 measurement reporting criteria are met may comprise waiting for the TTT for the layer 3 measurements before forwarding the layer 3 measurements for layer 3 reporting.

According to embodiments, a user equipment (UE) for handling layer 3 handover and layer 1/layer 2 triggered mobility (LTM) measurement in a wireless network, may comprise a communicator. The UE may comprise memory storing one or more computer programs. The UE may comprise one or more processors communicatively coupled to the communicator and the memory. The one or more computer programs may include computer-executable instructions that, when executed by the one or more processors, cause the UE to receive a layer 3 measurement reporting configuration and LTM measurement reporting configuration from a centralized unit (CU) of a network apparatus in the wireless network. The one or more computer programs may include computer-executable instructions that, when executed by the one or more processors, cause the UE to determine measurements for cells configured for the layer 3 handover at the layer 1 of the UE based on the layer 3 measurement reporting configuration, and determine measurements for cells configured for the LTM measurement at the layer 1 of the UE based on the LTM measurement reporting configuration. The one or more computer programs may include computer-executable instructions that, when executed by the one or more processors, cause the UE to determine at least one of layer 3 measurement for the cells configured for the layer 3 handover meets layer 3 measurement reporting criteria, or that the LTM measurement for the cells configured for the LTM measurement meets LTM measurement reporting criteria. The one or more computer programs may include computer-executable instructions that, when executed by the one or more processors, cause the UE to transmit, by the UE, one of the layer 3 measurement to the CU of the network apparatus when the layer 3 measurement for the cells configured for the layer 3 handover meets the layer 3 measurement reporting criteria, or the LTM measurement to a distributed unit (DU) of the network apparatus when the LTM measurement for the cells configured for the LTM measurement meets the LTM measurement reporting criteria.

In an embodiment, the one or more computer programs may further include computer-executable instructions that, when executed by the one or more processors, cause the UE to, in case that the layer 3 measurement reporting criteria is met, determine whether a time to trigger (TTT) for the layer 3 measurement reporting criteria is met. The one or more computer programs may further include computer-executable instructions that, when executed by the one or more processors, cause the UE to, in case that the TTT for the layer 3 measurement reporting criteria is met, check whether LTM measurement reporting criteria is met, and whether the LTM measurement is better than the layer 3 measured cell to forward the LTM measurements for LTM reporting. The one or more computer programs may further include computer-executable instructions that, when executed by the one or more processors, cause the UE to, in case that the LTM measurement reporting criteria is not met, or the LTM measurement is not better than the layer 3 measured cell to forward the LTM measurements for LTM reporting, forward the LTM measurements to a radio resource control (RRC) for LTM reporting. The one or more computer programs may further include computer-executable instructions that, when executed by the one or more processors, cause the UE to, in case that the TTT for the layer 3 measurement reporting criteria is not met, forward the LTM measurements to a radio resource control (RRC) for LTM measurement reporting.

In an embodiment, to determine that the layer 3 measurement reporting criteria is met, the one or more computer programs may further include computer-executable instructions that, when executed by the one or more processors, cause the UE to wait for the TTT for the LTM measurements before forwarding the LTM measurements for LTM reporting.

In an embodiment, the one or more computer programs may further include computer-executable instructions that, when executed by the one or more processors, cause the UE to, in case that the LTM measurement reporting criteria is met, determine whether a time to trigger (TTT) for the LTM measurement reporting criteria is met. The one or more computer programs may further include computer-executable instructions that, when executed by the one or more processors, cause the UE to, in case that the TTT for the LTM measurement reporting criteria is met, check whether the layer 3 measurement reporting criteria is met, and whether the layer 3 measurement is better than LTM measured cell to forward the layer 3 measurements for layer 3 reporting. The one or more computer programs may further include computer-executable instructions that, when executed by the one or more processors, cause the UE to, in case that the layer 3 measurement reporting criteria is not met, or the layer 3 measurement is not better than LTM measured cell to forward the layer 3 measurements for layer 3 reporting, forwarding, by the UE, the layer 3 measurements to layer 1 for the LTM reporting. The one or more computer programs may further include computer-executable instructions that, when executed by the one or more processors, cause the UE to, in case that the TTT for the LTM measurement reporting criteria is not met, forward the layer 3 measurements to layer 1 for the LTM reporting.

In an embodiment, to determine that the LTM measurement reporting criteria is met, the one or more computer programs may further include computer-executable instructions that, when executed by the one or more processors, cause the UE to wait for the TTT for the layer 3 measurements before forwarding the layer 3 measurements for layer 3 reporting.

In an embodiment, to determine the at least one of the layer 3 measurement for the cells configured for the layer 3 handover meets the layer 3 measurement reporting criteria, or that the LTM measurement for the cells configured for the LTM measurement meets the LTM reporting criteria, the one or more computer programs may further include computer-executable instructions that, when executed by the one or more processors, cause the UE to determine that both the layer 3 measurement reporting criteria and the LTM measurement reporting criteria are met. The one or more computer programs may further include computer-executable instructions that, when executed by the one or more processors, cause the UE to determine whether a time to trigger (TTT) for the layer 3 measurement reporting criteria is met. The one or more computer programs may further include computer-executable instructions that, when executed by the one or more processors, cause the UE to, in case that the TTT for the layer 3 measurement reporting criteria is met, check whether the LTM measurement reporting criteria is met, and whether the LTM measurement reporting criteria is better than the layer 3 measured cell. The one or more computer programs may further include computer-executable instructions that, when executed by the one or more processors, cause the UE to, in case that the LTM measurement reporting criteria is met and the LTM measurement reporting criteria is better than the layer 3 measured cell, wait for a TTT for the LTM measurements before forwarding the LTM measurements for LTM reporting. The one or more computer programs may further include computer-executable instructions that, when executed by the one or more processors, cause the UE to, in case that the LTM measurement reporting criteria is not met or the LTM measurement reporting criteria is not better than the layer 3 measured cell, forward the LTM measurements to a radio resource control (RRC) for LTM measurement reporting. The one or more computer programs may further include computer-executable instructions that, when executed by the one or more processors, cause the UE to, in case that the TTT for the layer 3 measurement reporting criteria is not met, forward the LTM measurements to the RRC for the layer 1 reporting.

In an embodiment, to determine that both the LTM measurement reporting criteria is met and the layer 3 measurement reporting criteria is met, the one or more computer programs may further include computer-executable instructions that, when executed by the one or more processors, cause the UE to wait for the TTT for the LTM measurements before forwarding the LTM measurements for LTM reporting.

In an embodiment, the one or more computer programs may further include computer-executable instructions that, when executed by the one or more processors, cause the UE to, determine that both the LTM measurement reporting criteria and the LTM measurement reporting criteria is met to perform one of determine whether the TTT for the LTM measurement reporting criteria is met, check whether the layer 3 measurement reporting criteria is met, and whether the layer 3 measurement reporting criteria is better than the LTM measured cell then waiting for the layer 3 measurements, and forward the layer 3 measurements for layer 3 measurement reporting, or forward the layer 3 measurements to layer 1 for the LTM reporting, when no criteria is met.

In an embodiment, wherein, to determine that both the LTM measurement reporting criteria is met and the layer 3 measurement reporting criteria are met, the one or more computer programs may further include computer-executable instructions that, when executed by the one or more processors, cause the UE to, wait for the TTT for the layer 3 measurements before forwarding the layer 3 measurements for layer 3 reporting.

In an embodiment, the received layer 3 measurement reporting configuration and LTM measurement reporting configuration may be received through a radio resource configuration (RRC) message.

In an embodiment, the one or more computer programs may further include computer-executable instructions that, when executed by the one or more processors, cause the UE to receive a radio resource configuration (RRC) request message requesting L1 to perform measurements for cells configured for L3/legacy handover. To determine measurements for cells configured for the layer 3 handover at the layer 1 of the UE may be based on the received RRC request message.

According to embodiments, one or more non-transitory computer-readable storage media storing one or more computer programs including computer-executable instructions that, when executed by one or more processors of a user equipment (UE), cause the UE to perform operations, the operations may comprise receiving, by the UE, layer 3 measurement reporting configuration and LTM measurement reporting configuration from a centralized unit (CU) of a network apparatus in a wireless network. The operations may comprise determining, by the UE, measurements for cells configured for a layer 3 handover at the layer 1 of the UE based on the layer 3 measurement reporting configuration, and measurements for cells configured for the LTM measurement at the layer 1 of the UE based on the LTM measurement reporting configuration. The operations may comprise determining, by the UE, at least one of layer 3 measurement for the cells configured for the layer 3 handover meets layer 3 measurement reporting criteria, or that the LTM measurement for the cells configured for the LTM measurement meets LTM measurement reporting criteria. The operations may comprise transmitting, by the UE, one of the layer 3 measurement to the CU of the network apparatus when the layer 3 measurement for the cells configured for the layer 3 handover meets the layer 3 measurement reporting criteria, or the LTM measurement to a distributed unit (DU) of the network apparatus when the LTM measurement for the cells configured for the LTM measurement meets the LTM measurement reporting criteria.

In an embodiment, the operations may further comprise, in case that the layer 3 measurement reporting criteria is met, determining, by the UE, whether a time to trigger (TTT) for the layer 3 measurement reporting criteria is met. The operations may further comprise, in case that the TTT for the layer 3 measurement reporting criteria is met, checking whether LTM measurement reporting criteria is met, and whether the LTM measurement is better than the layer 3 measured cell to forward the LTM measurements for LTM reporting. The operations may further comprise, in case that the LTM measurement reporting criteria is not met, or the LTM measurement is not better than the layer 3 measured cell to forward the LTM measurements for LTM reporting, forwarding, by the UE, the LTM measurements to a radio resource control (RRC) for LTM reporting. The operations may further comprise, in case that the TTT for the layer 3 measurement reporting criteria is not met, forwarding, by the UE, the LTM measurements to RRC for LTM measurement reporting.

According to embodiments, a method performed by a user equipment (UE) for handling layer 3 handover and layer 1/layer 2 triggered mobility (LTM) in a wireless network, may comprise receiving layer 3 measurement reporting configuration and LTM measurement reporting configuration from a centralized unit (CU) in the wireless network. The method may comprise determining layer 3 measurement for cell related to the layer 3 handover at the layer 1 of the UE based on the layer 3 measurement reporting configuration, and LTM measurement for cell related to the LTM at the layer 1 of the UE based on the LTM measurement reporting configuration. The method may comprise determining whether the layer 3 measurement for the cell related to the layer 3 handover meets layer 3 measurement reporting criteria, and whether the LTM measurement for the cell related to the LTM meets LTM measurement reporting criteria. The method may comprise in accordance with a determination that at least one of that the layer 3 measurement for the cell related to the layer 3 handover meets layer 3 measurement reporting criteria, or that the LTM measurement for the cell related to the LTM meets the LTM measurement reporting criteria, transmitting one of the layer 3 measurement to the CU, or the LTM measurement to a distributed unit (DU).

In an embodiment, the determining whether the layer 3 measurement meets the layer 3 measurement reporting criteria, and whether the LTM measurement meets the LTM measurement reporting criteria may comprise determining that the layer 3 measurement reporting criteria from among the layer 3 measurement reporting criteria and the LTM measurement reporting criteria is met. The determining whether the layer 3 measurement meets the layer 3 measurement reporting criteria, and whether the LTM measurement meets the LTM measurement reporting criteria may comprise determining whether a time to trigger (TTT) for the layer 3 measurement reporting criteria is met. The determining whether the layer 3 measurement meets the layer 3 measurement reporting criteria, and whether the LTM measurement meets the LTM measurement reporting criteria may comprise, in case that the TTT for the layer 3 measurement reporting criteria is met, checking whether the LTM measurement reporting criteria is met, and whether the LTM measurement is better than the layer 3 measured cell. The determining whether the layer 3 measurement meets the layer 3 measurement reporting criteria, and whether the LTM measurement meets the LTM measurement reporting criteria may comprise, in case that the TTT for the layer 3 measurement reporting criteria is not met, forwarding the layer 3 measurement to a RRC of the UE for legacy reporting.

In an embodiment, the method may further comprise, in case that the determining that the layer 3 measurement reporting criteria is met, that the TTT for the layer 3 measurement reporting criteria is met, and that whether the LTM measurement reporting criteria is met and the LTM measurement is better than the layer 3 measured cell, waiting for a TTT for the LTM measurement before forwarding the LTM measurement for LTM reporting. The method may further comprise, in case that the determining that the layer 3 measurement reporting criteria is met, that the TTT for the layer 3 measurement reporting criteria is met, and in case that the determining that the LTM measurement reporting criteria is not met, or the LTM measurement is not better than the layer 3 measured cell, forwarding the layer 3 measurement to the RRC of the UE for the legacy reporting.

In an embodiment, the determining whether the layer 3 measurement meets the layer 3 measurement reporting criteria, and whether the the LTM measurement meets the LTM measurement reporting criteria may comprise determining that the LTM measurement reporting criteria from among the layer 3 measurement reporting criteria and the LTM measurement reporting criteria is met. The determining whether the layer 3 measurement meets the layer 3 measurement reporting criteria, and whether the the LTM measurement meets the LTM measurement reporting criteria may comprise determining whether a time to trigger (TTT) for the LTM measurement reporting criteria is met. determining whether the layer 3 measurement meets the layer 3 measurement reporting criteria, and whether the the LTM measurement meets the LTM measurement reporting criteria may comprise, in case that the TTT for the LTM measurement reporting criteria is met, checking whether the layer 3 measurement reporting criteria is met, and whether the layer 3 measurement is better than LTM measured cell. determining whether the layer 3 measurement meets the layer 3 measurement reporting criteria, and whether the the LTM measurement meets the LTM measurement reporting criteria may comprise, in case that the TTT for the LTM measurement reporting criteria is not met, forwarding the LTM measurement to the layer 1 of the UE for LTM reporting.

In an embodiment, the method may further comprise, in case that the determining that the LTM measurement reporting criteria is met, that the TTT for the LTM measurement reporting criteria is met, and that the layer 3 measurement reporting criteria is met and the layer 3 measurement is better than the LTM measured cell, waiting for a TTT for the layer 3 measurements before forwarding the layer 3 measurement for layer 3 reporting. The method may further comprise, in case that the determining that the LTM measurement reporting criteria is met, that the TTT for the LTM measurement reporting criteria is met, and in case that the layer 3 measurement reporting criteria is not met, or the layer 3 measurement is not better than LTM measured cell, forwarding the LTM measurement to the layer 1 of the UE for the LTM reporting.

In an embodiment, the determining whether the layer 3 measurement meets the layer 3 measurement reporting criteria, and whether the LTM measurement meets the LTM measurement reporting criteria may comprise determining that both the layer 3 measurement reporting criteria and the LTM measurement reporting criteria are met. The determining whether the layer 3 measurement meets the layer 3 measurement reporting criteria, and whether the LTM measurement meets the LTM measurement reporting criteria may comprise determining whether a time to trigger (TTT) for the layer 3 measurement reporting criteria is met before that a TTT for the LTM measurement reporting criteria is met. The determining whether the layer 3 measurement meets the layer 3 measurement reporting criteria, and whether the LTM measurement meets the LTM measurement reporting criteria may comprise, in case that the TTT for the layer 3 measurement reporting criteria is met, checking whether the LTM measurement reporting criteria is met, and whether the LTM measurement reporting criteria is better than the layer 3 measured cell.

In an embodiment, the method may further comprise, in case that the LTM measurement reporting criteria is met and the LTM measurement reporting criteria is better than the layer 3 measured cell, waiting for the TTT for the LTM measurement before forwarding the LTM measurement for LTM reporting. The method may further comprise, in case that the LTM measurement reporting criteria is not met or the LTM measurement reporting criteria is not better than the layer 3 measured cell, forwarding the layer 3 measurement to a RRC of the UE for legacy reporting.

In an embodiment, the determining whether the layer 3 measurement meets the layer 3 measurement reporting criteria, and whether the LTM measurement meets the LTM measurement reporting criteria may comprise determining that both the layer 3 measurement reporting criteria and the LTM measurement reporting criteria are met. The determining whether the layer 3 measurement meets the layer 3 measurement reporting criteria, and whether the LTM measurement meets the LTM measurement reporting criteria may comprise determining whether a time to trigger (TTT) for the LTM measurement reporting criteria is met before that a TTT for the layer 3 measurement reporting criteria is met. The determining whether the layer 3 measurement meets the layer 3 measurement reporting criteria, and whether the LTM measurement meets the LTM measurement reporting criteria may comprise, in case that the TTT for the LTM measurement reporting criteria is met, checking whether the layer 3 measurement reporting criteria is met, and whether the layer 3 measurement reporting criteria is better than the LTM measured cell.

In an embodiment, the method may further comprise, in case that the layer 3 measurement reporting criteria is met and the layer 3 measurement reporting criteria is better than the LTM measured cell, waiting for the TTT for the layer 3 measurement before forwarding the layer 3 measurement for the legacy reporting. The method may further comprise, in case that the layer 3 measurement reporting criteria is not met or the layer 3 measurement reporting criteria is not better than the LTM measured cell, forwarding the LTM measurement to the layer 1 of the UE for LTM reporting.

According to embodiments, a user equipment (UE) for handling layer 3 handover and layer 1/layer 2 triggered mobility (LTM) measurement in a wireless network, may comprise a communicator. The UE may comprise memory storing one or more computer programs. The UE may comprise one or more processors communicatively coupled to the communicator and the memory. The one or more computer programs may include computer-executable instructions that, when individually or collectively executed by the one or more processors, cause the UE to receive layer 3 measurement reporting configuration and LTM measurement reporting configuration from a centralized unit (CU) in the wireless network. The one or more computer programs may include computer-executable instructions that, when individually or collectively executed by the one or more processors, cause the UE to determine layer 3 measurement for cell related to the layer 3 handover at the layer 1 of the UE based on the layer 3 measurement reporting configuration, and LTM measurement for cell related to the LTM at the layer 1 of the UE based on the LTM measurement reporting configuration. The one or more computer programs may include computer-executable instructions that, when individually or collectively executed by the one or more processors, cause the UE to determine whether the layer 3 measurement for the cell related to the layer 3 handover meets layer 3 measurement reporting criteria, and whether the LTM measurement for the cell related to the LTM meets LTM measurement reporting criteria. The one or more computer programs may include computer-executable instructions that, when individually or collectively executed by the one or more processors, cause the UE to, in accordance with a determination that at least one of that the layer 3 measurement for the cell related to the layer 3 handover meets layer 3 measurement reporting criteria, or that the LTM measurement for the cell related to the LTM meets the LTM measurement reporting criteria, transmit one of the layer 3 measurement to the CU, or the LTM measurement to a distributed unit (DU).

In an embodiment, to determine whether the layer 3 measurement meets the layer 3 measurement reporting criteria, and whether the LTM measurement meets the LTM measurement reporting criteria, the one or more computer programs may further include computer-executable instructions that, when individually or collectively executed by the one or more processors, cause the UE to determine that the layer 3 measurement reporting criteria from among the layer 3 measurement reporting criteria and the LTM measurement reporting criteria is met. To determine whether the layer 3 measurement meets the layer 3 measurement reporting criteria, and whether the LTM measurement meets the LTM measurement reporting criteria, the one or more computer programs may further include computer-executable instructions that, when individually or collectively executed by the one or more processors, cause the UE to determine whether a time to trigger (TTT) for the layer 3 measurement reporting criteria is met. To determine whether the layer 3 measurement meets the layer 3 measurement reporting criteria, and whether the LTM measurement meets the LTM measurement reporting criteria, the one or more computer programs may further include computer-executable instructions that, when individually or collectively executed by the one or more processors, cause the UE to, in case that the TTT for the layer 3 measurement reporting criteria is met, check whether the LTM measurement reporting criteria is met, and whether the LTM measurement is better than the layer 3 measured cell. To determine whether the layer 3 measurement meets the layer 3 measurement reporting criteria, and whether the LTM measurement meets the LTM measurement reporting criteria, the one or more computer programs may further include computer-executable instructions that, when individually or collectively executed by the one or more processors, cause the UE to, in case that the TTT for the layer 3 measurement reporting criteria is not met, forward the layer 3 measurement to a RRC of the UE for legacy reporting.

In an embodiment, the one or more computer programs may further include computer-executable instructions that, when individually or collectively executed by the one or more processors, cause the UE to, in case that the determining that the layer 3 measurement reporting criteria is met, that the TTT for the layer 3 measurement reporting criteria is met, and that whether the LTM measurement reporting criteria is met and the LTM measurement is better than the layer 3 measured cell, wait for a TTT for the LTM measurement before forwarding the LTM measurement for LTM reporting. The one or more computer programs may further include computer-executable instructions that, when individually or collectively executed by the one or more processors, cause the UE to, in case that the determining that the layer 3 measurement reporting criteria is met, that the TTT for the layer 3 measurement reporting criteria is met, and in case that the determining that the LTM measurement reporting criteria is not met, or the LTM measurement is not better than the layer 3 measured cell, forward the layer 3 measurement to the RRC of the UE for the legacy reporting.

In an embodiment, to determine whether the layer 3 measurement meets the layer 3 measurement reporting criteria, and whether the the LTM measurement meets the LTM measurement reporting criteria, the one or more computer programs may further include computer-executable instructions that, when individually or collectively executed by the one or more processors, cause the UE to determine that the LTM measurement reporting criteria from among the layer 3 measurement reporting criteria and the LTM measurement reporting criteria is met. To determine whether the layer 3 measurement meets the layer 3 measurement reporting criteria, and whether the the LTM measurement meets the LTM measurement reporting criteria, the one or more computer programs may further include computer-executable instructions that, when individually or collectively executed by the one or more processors, cause the UE to determine whether a time to trigger (TTT) for the LTM measurement reporting criteria is met. To determine whether the layer 3 measurement meets the layer 3 measurement reporting criteria, and whether the the LTM measurement meets the LTM measurement reporting criteria, the one or more computer programs may further include computer-executable instructions that, when individually or collectively executed by the one or more processors, cause the UE to, in case that the TTT for the LTM measurement reporting criteria is met, check whether the layer 3 measurement reporting criteria is met, and whether the layer 3 measurement is better than LTM measured cell. To determine whether the layer 3 measurement meets the layer 3 measurement reporting criteria, and whether the the LTM measurement meets the LTM measurement reporting criteria, the one or more computer programs may further include computer-executable instructions that, when individually or collectively executed by the one or more processors, cause the UE to, in case that the TTT for the LTM measurement reporting criteria is not met, forward the LTM measurement to the layer 1 of the UE for LTM reporting.

In an embodiment, the one or more computer programs may further include computer-executable instructions that, when individually or collectively executed by the one or more processors, cause the UE to, in case that the determining that the LTM measurement reporting criteria is met, that the TTT for the LTM measurement reporting criteria is met, and that the layer 3 measurement reporting criteria is met and the layer 3 measurement is better than the LTM measured cell, wait for a TTT for the layer 3 measurements before forwarding the layer 3 measurement for layer 3 reporting. The one or more computer programs may further include computer-executable instructions that, when individually or collectively executed by the one or more processors, cause the UE to, in case that the determining that the LTM measurement reporting criteria is met, that the TTT for the LTM measurement reporting criteria is met, and in case that the layer 3 measurement reporting criteria is not met, or the layer 3 measurement is not better than LTM measured cell, forward the LTM measurement to the layer 1 of the UE for the LTM reporting.

In an embodiment, to determine whether the layer 3 measurement meets the layer 3 measurement reporting criteria, and whether the LTM measurement meets the LTM measurement reporting criteria, the one or more computer programs may further include computer-executable instructions that, when individually or collectively executed by the one or more processors, cause the UE to determine that both the layer 3 measurement reporting criteria and the LTM measurement reporting criteria are met. To determine whether the layer 3 measurement meets the layer 3 measurement reporting criteria, and whether the LTM measurement meets the LTM measurement reporting criteria, the one or more computer programs may further include computer-executable instructions that, when individually or collectively executed by the one or more processors, cause the UE to determine whether a time to trigger (TTT) for the layer 3 measurement reporting criteria is met before that a TTT for the LTM measurement reporting criteria is met. To determine whether the layer 3 measurement meets the layer 3 measurement reporting criteria, and whether the LTM measurement meets the LTM measurement reporting criteria, the one or more computer programs may further include computer-executable instructions that, when individually or collectively executed by the one or more processors, cause the UE to, in case that the TTT for the layer 3 measurement reporting criteria is met, check whether the LTM measurement reporting criteria is met, and whether the LTM measurement reporting criteria is better than the layer 3 measured cell.

In an embodiment, the one or more computer programs may further include computer-executable instructions that, when individually or collectively executed by the one or more processors, cause the UE to, in case that the LTM measurement reporting criteria is met and the LTM measurement reporting criteria is better than the layer 3 measured cell, wait for the TTT for the LTM measurement before forwarding the LTM measurement for LTM reporting. The one or more computer programs may further include computer-executable instructions that, when individually or collectively executed by the one or more processors, cause the UE to, in case that the LTM measurement reporting criteria is not met or the LTM measurement reporting criteria is not better than the layer 3 measured cell, forward the layer 3 measurement to a RRC of the UE for legacy reporting.

In an embodiment, to determine whether the layer 3 measurement meets the layer 3 measurement reporting criteria, and whether the LTM measurement meets the LTM measurement reporting criteria, the one or more computer programs may further include computer-executable instructions that, when individually or collectively executed by the one or more processors, cause the UE to determine that both the layer 3 measurement reporting criteria and the LTM measurement reporting criteria are met.

To determine whether the layer 3 measurement meets the layer 3 measurement reporting criteria, and whether the LTM measurement meets the LTM measurement reporting criteria, the one or more computer programs may further include computer-executable instructions that, when individually or collectively executed by the one or more processors, cause the UE to determine whether a time to trigger (TTT) for the LTM measurement reporting criteria is met before that a TTT for the layer 3 measurement reporting criteria is met. To determine whether the layer 3 measurement meets the layer 3 measurement reporting criteria, and whether the LTM measurement meets the LTM measurement reporting criteria, the one or more computer programs may further include computer-executable instructions that, when individually or collectively executed by the one or more processors, cause the UE to, in case that the TTT for the LTM measurement reporting criteria is met, check whether the layer 3 measurement reporting criteria is met, and whether the layer 3 measurement reporting criteria is better than the LTM measured cell.

In an embodiment, the one or more computer programs may further include computer-executable instructions that, when individually or collectively executed by the one or more processors, cause the UE to, in case that the layer 3 measurement reporting criteria is met and the layer 3 measurement reporting criteria is better than the LTM measured cell, wait for the TTT for the layer 3 measurement before forwarding the layer 3 measurement for the legacy reporting. The one or more computer programs may further include computer-executable instructions that, when individually or collectively executed by the one or more processors, cause the UE to, in case that the layer 3 measurement reporting criteria is not met or the layer 3 measurement reporting criteria is not better than the LTM measured cell, forward the LTM measurement to the layer 1 of the UE for LTM reporting.

In an embodiment, the received layer 3 measurement reporting configuration and LTM measurement reporting configuration may be received through a radio resource configuration (RRC) message.

According to embodiments, one or more non-transitory computer-readable storage media storing one or more computer programs including computer-executable instructions that, when individually or collectively executed by one or more processors of a user equipment (UE), may cause the UE to perform operations. The operations may comprise receiving layer 3 measurement reporting configuration and LTM measurement reporting configuration from a centralized unit (CU) in the wireless network. The operations may comprise determining layer 3 measurement for cell related to the layer 3 handover at the layer 1 of the UE based on the layer 3 measurement reporting configuration, and LTM measurement for cell related to the LTM at the layer 1 of the UE based on the LTM measurement reporting configuration. The operations may comprise determining whether the layer 3 measurement for the cell related to the layer 3 handover meets layer 3 measurement reporting criteria, and whether the LTM measurement for the cell related to the LTM meets LTM measurement reporting criteria. The operations may comprise, in accordance with a determination that at least one of that the layer 3 measurement for the cell related to the layer 3 handover meets layer 3 measurement reporting criteria, or that the LTM measurement for the cell related to the LTM meets the LTM measurement reporting criteria, transmitting one of the layer 3 measurement to the CU, or the LTM measurement to a distributed unit (DU).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

No claim element is to be construed under the provisions of 35 U.S.C. § 112, sixth paragraph, unless the element is expressly recited using the phrase "means for" or "means".

What is claimed is:

1. A method performed by a user equipment (UE) for handling layer 3 handover and layer 1/layer 2 triggered mobility (LTM) in a wireless network, the method comprising:

receiving layer 3 measurement reporting configuration and LTM measurement reporting configuration from a centralized unit (CU) in the wireless network;

determining layer 3 measurement for cell related to the layer 3 handover at the layer 1 of the UE based on the layer 3 measurement reporting configuration, and LTM measurement for cell related to the LTM at the layer 1 of the UE based on the LTM measurement reporting configuration;

determining whether the layer 3 measurement for the cell related to the layer 3 handover meets layer 3 measurement reporting criteria, and whether the LTM measurement for the cell related to the LTM meets LTM measurement reporting criteria; and in accordance with a determination that at least one of that the layer 3 measurement for the cell related to the layer 3 handover meets layer 3 measurement reporting criteria, or that the LTM measurement for the cell related to the LTM meets the LTM measurement reporting criteria, transmitting one of:

the layer 3 measurement to the CU, or the LTM measurement to a distributed unit (DU).

2. The method of claim 1, wherein the determining whether the layer 3 measurement meets the layer 3 measurement reporting criteria, and whether the LTM measurement meets the LTM measurement reporting criteria comprises:

determining that the layer 3 measurement reporting criteria from among the layer 3 measurement reporting criteria and the LTM measurement reporting criteria is met;

determining whether a time to trigger (TTT) for the layer 3 measurement reporting criteria is met;

in case that the TTT for the layer 3 measurement reporting criteria is met, checking whether the LTM measurement reporting criteria is met, and whether the LTM measurement is better than the layer 3 measured cell; and in case that the TTT for the layer 3 measurement reporting criteria is not met, forwarding the layer 3 measurement to a RRC of the UE for legacy reporting.

3. The method of claim 2, wherein the method further comprising:

in case that the determining that the layer 3 measurement reporting criteria is met, that the TTT for the layer 3 measurement reporting criteria is met, and that whether the LTM measurement reporting criteria is met and the LTM measurement is better than the layer 3 measured cell, waiting for a TTT for the LTM measurement before forwarding the LTM measurement for LTM reporting; and in case that the determining that the layer 3 measurement reporting criteria is met, that the TTT for the layer 3 measurement reporting criteria is met, and in case that the determining that the LTM measurement reporting criteria is not met, or the LTM measurement is not better than the layer 3 measured cell, forwarding the layer 3 measurement to the RRC of the UE for the legacy reporting.

4. The method of claim 1, wherein the determining whether the layer 3 measurement meets the layer 3 measurement reporting criteria, and whether the the LTM measurement meets the LTM measurement reporting criteria comprises:

determining that the LTM measurement reporting criteria from among the layer 3 measurement reporting criteria and the LTM measurement reporting criteria is met;

determining whether a time to trigger (TTT) for the LTM measurement reporting criteria is met;

in case that the TTT for the LTM measurement reporting criteria is met, checking whether the layer 3 measurement reporting criteria is met, and whether the layer 3 measurement is better than LTM measured cell; and in case that the TTT for the LTM measurement reporting criteria is not met, forwarding the LTM measurement to the layer 1 of the UE for LTM reporting.

5. The method of claim 4, wherein the method further comprising:

in case that the determining that the LTM measurement reporting criteria is met, that the TTT for the LTM measurement reporting criteria is met, and that the layer 3 measurement reporting criteria is met and the layer 3 measurement is better than the LTM measured cell, waiting for a TTT for the layer 3 measurements before forwarding the layer 3 measurement for layer 3 reporting; and in case that the determining that the LTM measurement reporting criteria is met, that the TTT for the LTM measurement reporting criteria is met, and in case that the layer 3 measurement reporting criteria is not met, or the layer 3 measurement is not better than LTM measured cell, forwarding the LTM measurement to the layer 1 of the UE for the LTM reporting.

6. The method of claim 1, wherein the determining whether the layer 3 measurement meets the layer 3 measurement reporting criteria, and whether the LTM measurement meets the LTM measurement reporting criteria comprises:

determining that both the layer 3 measurement reporting criteria and the LTM measurement reporting criteria are met;

determining whether a time to trigger (TTT) for the layer 3 measurement reporting criteria is met before that a TTT for the LTM measurement reporting criteria is met; and in case that the TTT for the layer 3 measurement reporting criteria is met, checking whether the LTM measurement reporting criteria is met, and whether the LTM measurement reporting criteria is better than the layer 3 measured cell.

7. The method of claim 6, the method further comprising:

in case that the LTM measurement reporting criteria is met and the LTM measurement reporting criteria is better than the layer 3 measured cell, waiting for the TTT for the LTM measurement before forwarding the LTM measurement for LTM reporting; and in case that the LTM measurement reporting criteria is not met or the LTM measurement reporting criteria is not better than the layer 3 measured cell, forwarding the layer 3 measurement to a RRC of the UE for legacy reporting.

8. The method of claim 1, wherein the determining whether the layer 3 measurement meets the layer 3 measurement reporting criteria, and whether the LTM measurement meets the LTM measurement reporting criteria comprises:

determining that both the layer 3 measurement reporting criteria and the LTM measurement reporting criteria are met;

determining whether a time to trigger (TTT) for the LTM measurement reporting criteria is met before that a TTT for the layer 3 measurement reporting criteria is met; and in case that the TTT for the LTM measurement reporting criteria is met, checking whether the layer 3 measurement reporting criteria is met, and whether the layer 3 measurement reporting criteria is better than the LTM measured cell.

9. The method of claim 8, the method further comprising:

in case that the layer 3 measurement reporting criteria is met and the layer 3 measurement reporting criteria is better than the LTM measured cell, waiting for the TTT for the layer 3 measurement before forwarding the layer 3 measurement for legacy reporting; and in case that the layer 3 measurement reporting criteria is not met or the layer 3 measurement reporting criteria is not better than the LTM measured cell, forwarding the LTM measurement to the layer 1 of the UE for LTM reporting.

10. A user equipment (UE) for handling layer 3 handover and layer 1/layer 2 triggered mobility (LTM) measurement in a wireless network, the UE comprising:

a communicator;

memory storing one or more computer programs; and one or more processors communicatively coupled to the communicator and the memory, wherein the one or more computer programs include computer-executable instructions that, when individually or collectively executed by the one or more processors, cause the UE to:

receive layer 3 measurement reporting configuration and LTM measurement reporting configuration from a centralized unit (CU) in the wireless network, determine layer 3 measurement for cell related to the layer 3 handover at the layer 1 of the UE based on the layer 3 measurement reporting configuration, and LTM measurement for cell related to the LTM at the layer 1 of the UE based on the LTM measurement reporting configuration, determine whether the layer 3 measurement for the cell related to the layer 3 handover meets layer 3 measurement reporting criteria, and whether the LTM measurement for the cell related to the LTM meets LTM measurement reporting criteria, and in accordance with a determination that at least one of that the layer 3 measurement for the cell related to the layer 3 handover meets layer 3 measurement reporting criteria, or that the LTM measurement for the cell related to the LTM meets the LTM measurement reporting criteria, transmit one of:

the layer 3 measurement to the CU, or the LTM measurement to a distributed unit (DU).

11. The UE of claim 10, wherein, to determine whether the layer 3 measurement meets the layer 3 measurement reporting criteria, and whether the LTM measurement meets the LTM measurement reporting criteria, the one or more computer programs further include computer-executable instructions that, when individually or collectively executed by the one or more processors, cause the UE to:

determine that the layer 3 measurement reporting criteria from among the layer 3 measurement reporting criteria and the LTM measurement reporting criteria is met, determine whether a time to trigger (TTT) for the layer 3 measurement reporting criteria is met, in case that the TTT for the layer 3 measurement reporting criteria is met, check whether the LTM measurement reporting criteria is met, and whether the LTM measurement is better than the layer 3 measured cell, and in case that the TTT for the layer 3 measurement reporting criteria is not met, forward the layer 3 measurement to a RRC of the UE for legacy reporting.

12. The UE of claim 11, wherein the one or more computer programs further include computer-executable instructions that, when individually or collectively executed by the one or more processors, cause the UE to:

in case that the determining that the layer 3 measurement reporting criteria is met, that the TTT for the layer 3 measurement reporting criteria is met, and that whether the LTM measurement reporting criteria is met and the LTM measurement is better than the layer 3 measured cell, wait for a TTT for the LTM measurement before forwarding the LTM measurement for LTM reporting, and in case that the determining that the layer 3 measurement reporting criteria is met, that the TTT for the layer 3 measurement reporting criteria is met, and in case that the determining that the LTM measurement reporting criteria is not met, or the LTM measurement is not better than the layer 3 measured cell, forward the layer 3 measurement to the RRC of the UE for the legacy reporting.

13. The UE of claim 10, wherein, to determine whether the layer 3 measurement meets the layer 3 measurement reporting criteria, and whether the the LTM measurement meets the LTM measurement reporting criteria, the one or more computer programs further include computer-executable instructions that, when individually or collectively executed by the one or more processors, cause the UE to:

determine that the LTM measurement reporting criteria from among the layer 3 measurement reporting criteria and the LTM measurement reporting criteria is met, determine whether a time to trigger (TTT) for the LTM measurement reporting criteria is met, in case that the TTT for the LTM measurement reporting criteria is met, check whether the layer 3 measurement reporting criteria is met, and whether the layer 3 measurement is better than LTM measured cell, and in case that the TTT for the LTM measurement reporting criteria is not met, forward the LTM measurement to the layer 1 of the UE for LTM reporting.

14. The UE of claim 13, wherein the one or more computer programs further include computer-executable instructions that, when individually or collectively executed by the one or more processors, cause the UE to:

in case that the determining that the LTM measurement reporting criteria is met, that the TTT for the LTM measurement reporting criteria is met, and that the layer 3 measurement reporting criteria is met and the layer 3 measurement is better than the LTM measured cell, wait for a TTT for the layer 3 measurements before forwarding the layer 3 measurement for layer 3 reporting, and in case that the determining that the LTM measurement reporting criteria is met, that the TTT for the LTM measurement reporting criteria is met, and in case that the layer 3 measurement reporting criteria is not met, or the layer 3 measurement is not better than LTM measured cell, forward the LTM measurement to the layer 1 of the UE for the LTM reporting.

15. The UE of claim 10, wherein, to determine whether the layer 3 measurement meets the layer 3 measurement reporting criteria, and whether the LTM measurement meets the LTM measurement reporting criteria, the one or more computer programs further include computer-executable instructions that, when individually or collectively executed by the one or more processors, cause the UE to:

determine that both the layer 3 measurement reporting criteria and the LTM measurement reporting criteria are met, determine whether a time to trigger (TTT) for the layer 3 measurement reporting criteria is met before that a TTT for the LTM measurement reporting criteria is met, and in case that the TTT for the layer 3 measurement reporting criteria is met, check whether the LTM measurement reporting criteria is met, and whether the LTM measurement reporting criteria is better than the layer 3 measured cell.

16. The UE of claim 15, wherein the one or more computer programs further include computer-executable instructions that, when individually or collectively executed by the one or more processors, cause the UE to:

in case that the LTM measurement reporting criteria is met and the LTM measurement reporting criteria is better than the layer 3 measured cell, wait for the TTT for the LTM measurement before forwarding the LTM measurement for LTM reporting, and in case that the LTM measurement reporting criteria is not met or the LTM measurement reporting criteria is not better than the layer 3 measured cell, forward the layer 3 measurement to a RRC of the UE for legacy reporting.

17. The UE of claim 15, wherein, to determine whether the layer 3 measurement meets the layer 3 measurement reporting criteria, and whether the LTM measurement meets the LTM measurement reporting criteria, the one or more computer programs further include computer-executable instructions that, when individually or collectively executed by the one or more processors, cause the UE to:

determine that both the layer 3 measurement reporting criteria and the LTM measurement reporting criteria are met, determine whether a time to trigger (TTT) for the LTM measurement reporting criteria is met before that a TTT for the layer 3 measurement reporting criteria is met, and in case that the TTT for the LTM measurement reporting criteria is met, check whether the layer 3 measurement reporting criteria is met, and whether the layer 3 measurement reporting criteria is better than the LTM measured cell.

18. The UE of claim 17, wherein the one or more computer programs further include computer-executable instructions that, when individually or collectively executed by the one or more processors, cause the UE to:

in case that the layer 3 measurement reporting criteria is met and the layer 3 measurement reporting criteria is better than the LTM measured cell, wait for the TTT for the layer 3 measurement before forwarding the layer 3 measurement for legacy reporting, and in case that the layer 3 measurement reporting criteria is not met or the layer 3 measurement reporting criteria is not better than the LTM measured cell, forward the LTM measurement to the layer 1 of the UE for LTM reporting.

19. The UE of claim 10, wherein the received layer 3 measurement reporting configuration and LTM measurement reporting configuration are received through a radio resource configuration (RRC) message.

20. One or more non-transitory computer-readable storage media storing one or more computer programs including computer-executable instructions that, when individually or collectively executed by one or more processors of a user equipment (UE), cause the UE to perform operations, the operations comprising:

receiving layer 3 measurement reporting configuration and LTM measurement reporting configuration from a centralized unit (CU) in a wireless network;

determining layer 3 measurement for cell related to layer 3 handover at the layer 1 of the UE based on the layer 3 measurement reporting configuration, and LTM measurement for cell related to the LTM at the layer 1 of the UE based on the LTM measurement reporting configuration;

determining whether the layer 3 measurement for the cell related to the layer 3 handover meets layer 3 measurement reporting criteria, and whether the LTM measurement for the cell related to the LTM meets LTM measurement reporting criteria; and in accordance with a determination that at least one of that the layer 3 measurement for the cell related to the layer 3 handover meets layer 3 measurement reporting criteria, or that the LTM measurement for the cell related to the LTM meets the LTM measurement reporting criteria, transmitting one of:

the layer 3 measurement to the CU, or the LTM measurement to a distributed unit (DU).

* * * * *